United States Patent
Aoi et al.

(10) Patent No.: US 10,412,277 B2
(45) Date of Patent: Sep. 10, 2019

(54) DOME-TYPE CAMERA AND DOME COVER

(71) Applicant: FUJIFILM Corporation, Tokyo (JP)

(72) Inventors: Toshihiro Aoi, Saitama (JP); Kazuya Yoneyama, Saitama (JP); Hiroyuki Oshima, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 15/715,494

(22) Filed: Sep. 26, 2017

(65) Prior Publication Data

US 2018/0020135 A1 Jan. 18, 2018

Related U.S. Application Data

(63) Continuation of application No. PCT/JP2015/083572, filed on Nov. 30, 2015.

(30) Foreign Application Priority Data

Mar. 31, 2015 (JP) .................... 2015-072939

(51) Int. Cl.
*G03B 17/08* (2006.01)
*G03B 17/14* (2006.01)
(Continued)

(52) U.S. Cl.
CPC ........... *H04N 5/2252* (2013.01); *G03B 17/08* (2013.01); *G03B 17/14* (2013.01); *G03B 17/565* (2013.01);
(Continued)

(58) Field of Classification Search
CPC ............... H04N 5/2252; H04N 5/2254; H04N 5/23203; H04N 5/23225; G03B 17/12;
(Continued)

(56) References Cited

U.S. PATENT DOCUMENTS

2002/0140850 A1* 10/2002 Toste ............... G08B 13/19619
348/375
2005/0185299 A1 8/2005 Kislev et al.
(Continued)

FOREIGN PATENT DOCUMENTS

CN 1866121 A 11/2006
CN 1984257 A 6/2007
(Continued)

OTHER PUBLICATIONS

International Preliminary Report on Patentability and Written Opinion of the International Searching Authority (forms PCT/IB/373 and PCT/ISA/237), dated Oct. 3, 2017, for corresponding International Application No. PCT/JP2015/083572, with an English translation of the Written Opinion.

(Continued)

*Primary Examiner* — Daniel M Pasiewicz
(74) *Attorney, Agent, or Firm* — Birch, Stewart, Kolasch & Birch, LLP

(57) ABSTRACT

A dome-type camera includes a dome cover (11) and a camera unit (12). The dome cover (11) has a front surface (21) and a back surface (22). The camera unit (12) includes an optical system (13) and an imaging element (14). The optical system (13) is disposed on the back surface (22) side of the dome cover (11), and the imaging element (14) outputs image data on the basis of imaging light received via the optical system (13). At least the back surface (22) out of the front surface (21) and the back surface (22) of the dome cover (11) has at least an aspheric shape in which optical properties are continuously changed at a location other than a top t of the dome cover (11).

14 Claims, 32 Drawing Sheets

(51) Int. Cl.
  *G03B 17/56* (2006.01)
  *H04N 5/225* (2006.01)
  *H04N 5/232* (2006.01)
  *G08B 13/196* (2006.01)

(52) U.S. Cl.
  CPC ... *G08B 13/1963* (2013.01); *G08B 13/19619* (2013.01); *G08B 13/19626* (2013.01); *H04N 5/225* (2013.01); *H04N 5/2254* (2013.01); *H04N 5/23203* (2013.01); *H04N 5/23225* (2013.01)

(58) Field of Classification Search
  CPC .................. G03B 17/14; G03B 17/565; G08B 13/19619; G08B 13/19626; G08B 13/1963
  See application file for complete search history.

(56) References Cited

U.S. PATENT DOCUMENTS

| 2006/0177217 | A1* | 8/2006 | Opmeer | G08B 13/19619 396/427 |
| 2007/0126871 | A1* | 6/2007 | Henninger, III | G08B 13/19619 348/151 |
| 2013/0223834 | A1 | 8/2013 | Jikihara et al. | |
| 2014/0248045 | A1 | 9/2014 | Wada et al. | |
| 2018/0017851 | A1* | 1/2018 | Watanabe | G03B 17/56 |
| 2018/0024416 | A1* | 1/2018 | Kishine | G02B 7/02 359/614 |

FOREIGN PATENT DOCUMENTS

| JP | 2005-86241 A | 3/2005 |
| JP | 3114298 U | 10/2005 |
| JP | 2012-103452 A | 5/2012 |
| JP | 2014-41380 A | 3/2014 |
| JP | 2014-44429 A | 3/2014 |
| JP | 2015-87737 A | 5/2015 |

OTHER PUBLICATIONS

International Search Report (form PCT/ISA/210), dated Mar. 1, 2016, for corresponding International Application No. PCT/JP2015/083572, with an English translation.
Office Action dated Jun. 20, 2019 in counterpart Chinese Patent Application No. 201580077971.9, with English translation.

* cited by examiner

DOME-TYPE CAMERA AND DOME COVER

CROSS-REFERENCE TO RELATED APPLICATIONS

The present application is a Continuation of PCT International Application No. PCT/JP2015/083572 filed on Nov. 30, 2015 claiming priority under 35 U.S.C. § 119(a) to Japanese Patent Application No. 2015-072939 filed on Mar. 31, 2015. Each of the above applications is hereby expressly incorporated by reference, in their entirety, into the present application.

BACKGROUND OF THE INVENTION

1. Field of the Invention

The invention relates to a dome-type camera and a dome cover, and particularly, relates to a technique relating to the shape of a dome cover.

2. Description of the Related Art

Although compact cameras have high mobility and applicability and can be used for various imaging applications irrespective of places or the like, it is necessary to refrain the cameras from being used depending on environments in the case of outdoor imaging. For example, since rainstorms, snow, dust, sand, or the like is not necessarily preferable for cameras that are precision instruments, it is difficult to sufficiently exhibit the mobility of the compact cameras in such environments.

In order to make the compact cameras usable in various environments, it is general to cover a part or whole of compact cameras with a transparent dome cover. However, although the environmental tolerance of the compact cameras is improved by using the dome cover, the merit that the size is small is sacrificed due to the installation of the dome cover, and the original "mobility of the compact cameras" may be reduced.

Since generally known dome covers have a spherical shape, the overall size thereof will become very large if the compact cameras are covered with the dome covers having such a shape. Hence, in order to realize "the compact cameras that hold environmental tolerance", dome covers in which a cylindrical portion (skirt (foot) portion) is combined with a spherical portion may be used.

For example, JP2012-103452A, JP2014-041380A, and JP2014-044429A disclose a dome-type camera that reduces image quality degradation while securing a wide visual field, in a case where imaging is performed in a direction close to a horizontal direction. In the dome-type camera disclosed in such JP2012-103452A, JP2014-041380A, and JP2014-044429A, a camera lens is covered with a dome cover having a hemispherical portion and a cylindrical portion connected to the hemispherical portion.

SUMMARY OF THE INVENTION

As described above, the dome cover does not necessarily have the spherical shape (hemispherical portion), and may have various shapes, such as a shape in which a spherical portion and a cylindrical portion are combined together.

Meanwhile, in a camera disposed within the dome cover, imaging is performed as imaging light that has passed through the dome cover is received by an imaging element in addition to an optical system, such as a lens. Hence, image data acquired by the imaging is influenced not only by the optical properties of the optical system but also by the optical properties of the dome cover.

Since the dome cover having the spherical shape shows substantially constant optical properties irrespective of an imaging direction, degradation of the image data brought about by the dome cover is very small. Meanwhile, in a case where the shape of the dome cover is not the spherical shape, the image data is influenced by the optical properties of the dome cover according to the shape. Particularly, in a case where the dome cover has a discontinuous portion in which optical properties, such as a focal length, are not continuous with an adjacent portion, image quality degradation, such as image blurring resulting from the discontinuous portion, will occur.

For example, in a case where the discontinuous portion is present between a spherical portion and a cylindrical portion in a dome cover including the spherical portion and the cylindrical portion, an image formed by the imaging light that has passed through the discontinuous portion will be blurred, and an image quality difference that can be visually recognized will be caused between this image and an image formed by the imaging light that has passed through another portions other than the discontinuous portion. One cause of such image blurring is that refractive indices are at locations (for example, the spherical portion and the cylindrical portion) straddling the discontinuous portion of the dome cover.

In the dome-type camera of JP2012-103452A, P2014-041380A, and JP2014-044429A, a partial shielding filter is used to prevent image quality degradation resulting from the discontinuous portion. That is, the image quality degradation is suppressed by a part of incident light being shielded by the partial shielding filter set to a half range on a side opposite to a zenith direction of the dome cover.

The method of cutting off a part of imaging light using such a partial shielding filter is effective in the case of "telephoto imaging in which the imaging angle of view is relatively small" and "an imaging direction closer to the horizontal direction", as described in JP2012-103452A, JP2014-041380A, and JP2014-044429A. However, this method is not necessarily effective in the case of "imaging (wide angle imaging) in which the imaging angle of view is relatively large", or the like. Particularly, in a case where the imaging light passing through not only a top peripheral portion (for example, the spherical portion) of the dome cover but also the skirt portion (for example, the cylindrical portion) of the dome cover is also effectively used to create image data, use of the partial shielding filter that cuts off the imaging light is not desirable.

The invention has been made in view of the above-described circumstances, and an object thereof is to provide a dome-type camera and a dome cover that reduce image quality degradation resulting from the optical properties of a dome cover in image data generated on the basis of imaging light that has passed through the dome cover.

One aspect of the invention relates to a dome-type camera comprises a dome cover having a front surface and a back surface; and a camera unit including an optical system disposed on the back surface side of the dome cover, and an imaging element that outputs image data on the basis of imaging light received via the optical system. At least the back surface out of the front surface and the back surface of the dome cover has an aspheric shape in which optical properties are continuously changed at least at a location other than a top of the dome cover.

According to this aspect, since the dome cover has "an aspheric shape in which optical properties are continuously changed at least at a location other than a top of the dome cover", image quality degradation caused by the dome cover can be effectively reduced in the image data. Here, the expression "optical properties are continuously changed" refers to optical properties (for example, focal length) being continuously changed in adjacent portions of the dome cover. That is, in the dome cover related to the present aspect, the optical properties (for example, the focal length) are continuously changed at least at the location other than the top. In addition, the fact that "optical properties (for example, focal length) are continuously changed" can be applied not only to a case where the optical properties vary depending on a place but also to a case where constant optical properties are exhibited without varying in optical properties irrespective of a place. Hence, each portion of the dome cover may have optical property (for example, focal length) different from the optical properties of its adjacent portion, or may have the same optical properties.

Preferably, at least the back surface out of the front surface and the back surface of the dome cover has an elliptical shape in a longitudinal section of the dome cover.

According to the present aspect, the dome cover, which is capable of being relatively easily produced and has excellent optical properties, can be used.

Preferably, at least the back surface out of the front surface and the back surface of the dome cover has a hyperelliptical shape in a longitudinal section of the dome cover.

According to the present aspect, the dome cover, which is capable of being relatively easily produced and has excellent optical properties, can be used.

Preferably, the dome cover is detachably mounted on the camera unit.

According to the present aspect, the dome cover can simply replaced.

Preferably, the dome-type camera further comprises a cover identification part that is provided in the dome cover and shows the type of the dome cover; and a cover specification part that specifies the type of the dome cover on the basis of the cover identification part.

According to the present aspect, the type of the dome cover can be simply specified.

Preferably, the cover identification part includes a unique shape portion according to the type of the dome cover, and the cover specification part specifies the type of the dome cover by detecting the unique shape portion of the cover identification part.

According to the present aspect, the type of the dome cover can be simply specified on the basis of the unique shape portion of the cover identification part.

Preferably, the cover specification part includes a contact detection part that detects physical contact of the unique shape portion of the cover identification part, and a dome type specification part that specifies the type of the dome cover in accordance with a detection result of the contact detection part. If the dome cover is mounted on the camera unit, the unique shape portion of the cover identification part physically comes into contact with the contact detection part.

According to the present aspect, the type of the dome cover can be simply specified on the basis of the physical contact between the unique shape portion of the cover identification part and the contact detection part.

Preferably, the cover identification part records information on the type of the dome cover in an electrically readable manner, and the cover specification part specifies the type of the dome cover by electrically reading the information on the type of the dome cover recorded on the cover identification part.

According to the present aspect, the type of the dome cover can be simply specified by electrically reading the information on the type of the dome cover.

Preferably, the cover identification part records information on the type of the dome cover in an optically readable manner, and the cover specification part specifies the type of the dome cover by optically reading the information on the type of the dome cover recorded on the cover identification part.

According to the present aspect, the type of the dome cover can be simply specified by optically reading the information on the type of the dome cover.

Preferably, the dome-type camera further comprises a compatibility determination part that determines compatibility between the dome cover and the camera unit on the basis of the type of the dome cover specified by the cover specification part.

According to the present aspect, the compatibility between the dome cover and the camera unit is determined.

Preferably, the dome-type camera further comprises a user notification part controlled by the compatibility determination part, and the compatibility determination part notifies a user of a determination result of the compatibility between the dome cover and the camera unit via the user notification part.

According to the present aspect, a user is notified of the compatibility between the dome cover and the camera unit.

Preferably, the dome-type camera further comprises a camera-side communication part that is communicable with a terminal device. The terminal device includes a terminal-side communication part that communicates with the camera-side communication part, a terminal-side control part connected to the terminal-side communication part, and a user interface connected to the terminal-side control part. The compatibility determination part transmits a determination result of the compatibility between the dome cover and the camera unit to the terminal-side control part via the camera-side communication part and the terminal-side communication part. The terminal-side control part notifies a user of the determination result of the compatibility between the dome cover and the camera unit via the user interface.

According to the present aspect, a user is notified of the compatibility between the dome cover and the camera unit via the user interface of the terminal device.

Preferably, the dome-type camera further comprises an image processing part that performs image processing of the image data, and a cover detection part that detects whether or not the dome cover is mounted on the camera unit. The image processing part adjusts the image processing of the image data in accordance with a detection result of the cover detection part.

According to the present aspect, the image processing of the image data is adjusted in accordance with the presence/absence of mounting of the dome cover.

Preferably, the dome-type camera further comprises a direction drive part capable of driving the optical system to change an optical axis direction.

According to the present aspect, image data in various imaging directions can be output from the imaging element by the optical axis direction of the optical system being changed.

Preferably, a focal length of the optical system is variable.

According to the present aspect, image data captured at various focal lengths can be output from the imaging element.

Preferably, the optical system has an angle of view of 90 degrees or more.

According to the present aspect, image data captured at an angle of view of 90 degrees or more can be output from the imaging element.

Another aspect of the invention is a dome cover having a front surface and a back surface and having an optical system disposed on the back surface side. At least the back surface out of the front surface and the back surface has an aspheric shape in which optical properties are continuously changed at least at a location other than a top of the dome cover.

According to the invention, since the dome cover has "an aspheric shape in which optical properties are continuously changed at least at a location other than a top of the dome cover", image quality degradation caused by the dome cover can be effectively reduced in the image data.

DESCRIPTION OF THE PREFERRED EMBODIMENTS

Hereinafter, embodiments of the invention will be described with reference to the drawings.

Although a dome cover having an aspheric shape regarding both a front surface and a back surface is used in an embodiment of the invention to be described below, the invention is not limited to this. It is possible to widely apply the invention to dome covers in which at least the back surface out of the front surface and the back surface are continuous in terms of changes in optical properties at least at a location other than a top, has no discontinuous section, and has the aspheric shape, and dome-type cameras including such dome covers.

Figure 1:
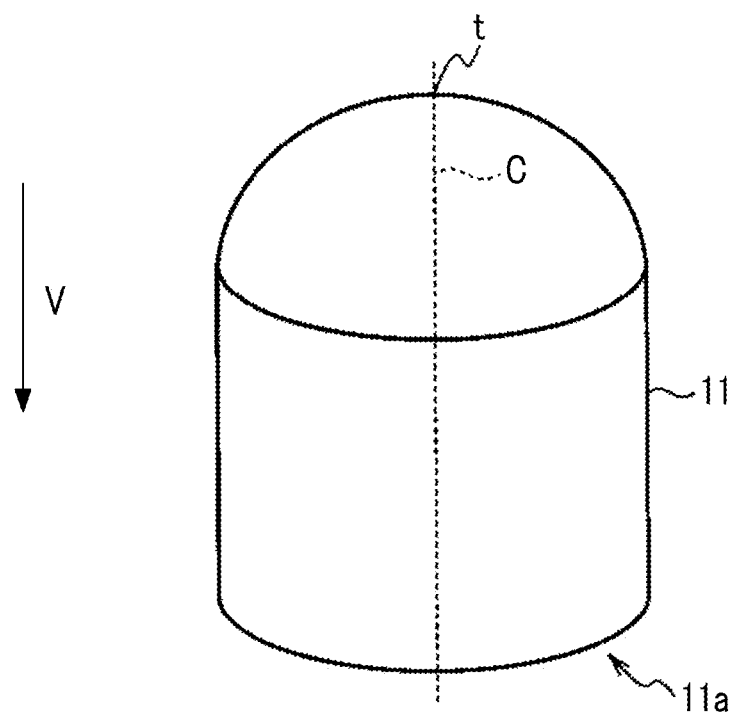
FIG. 1 is an external view illustrating an example of a dome cover.
Figure 2:
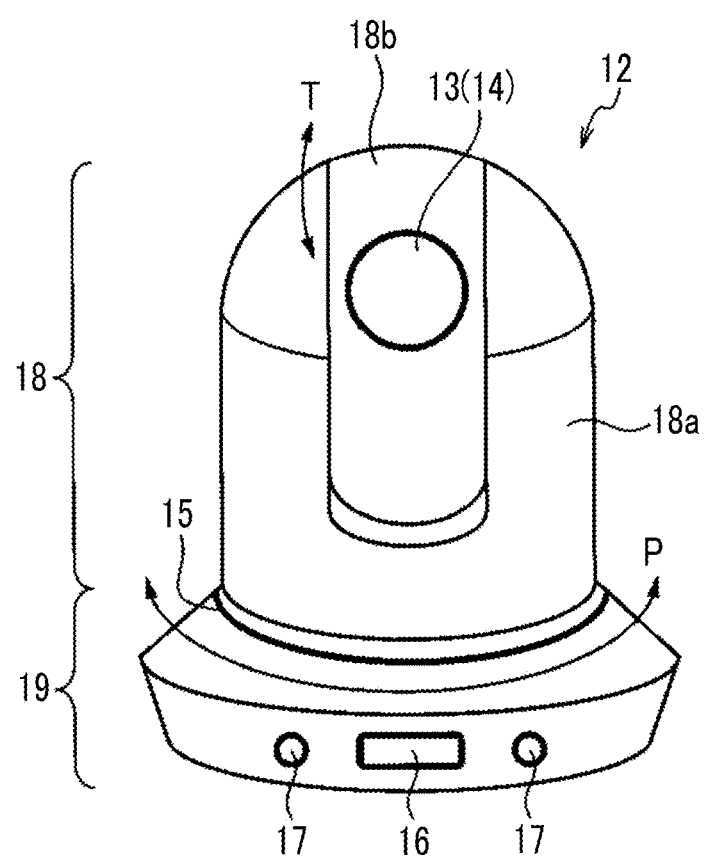
FIG. 2 is an external view illustrating an example of a camera unit.
Figure 3:
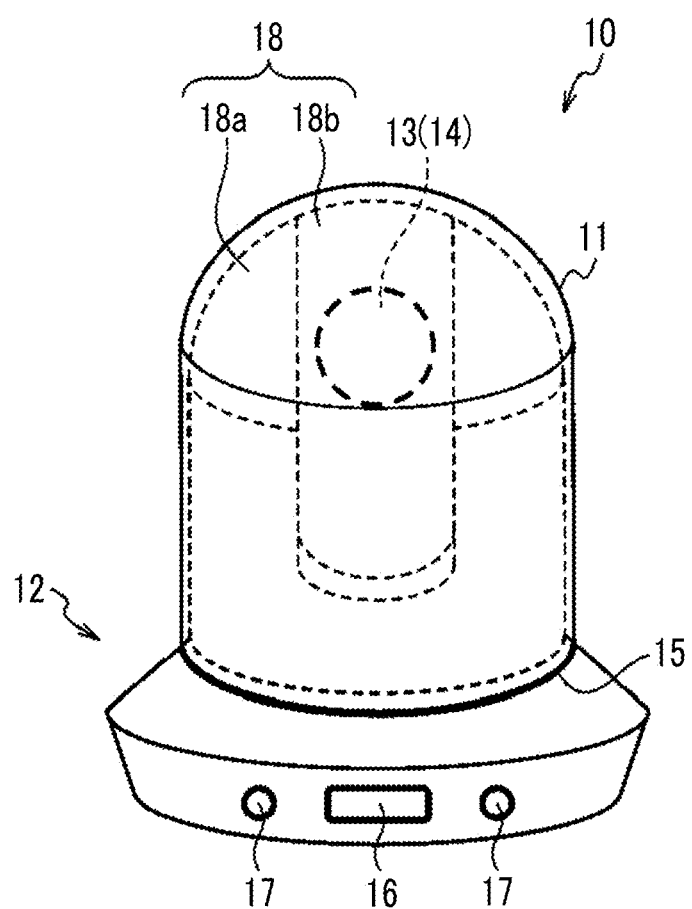
FIG. 3 is a view illustrating an example of a dome-type camera in which the dome cover of FIG. 1 is mounted on the camera unit of FIG. 2.

FIG. 1 is an external view illustrating an example of the dome cover 11. FIG. 2 is an external view illustrating an example of a camera unit 12. FIG. 3 is a view illustrating an example of a dome-type camera 10 in which the dome cover 11 of FIG. 1 is mounted on the camera unit 12 of FIG. 2.

The dome cover 11 illustrated in FIGS. 1 and 3 has a front surface and a back surface, and has a bell shape) in which the internal diameter thereof becomes gradually larger from a top t toward a cover opening 11a. The shape of a longitudinal section of the dome cover 11 obtained by cutting the dome cover 11 in a vertical direction V from the top t of the dome cover 11 toward the cover opening 11a is symmetrical with respect to a vertical line C extending in he vertical direction V through the top t. Although it is preferable that the thickness of the dome cover 11 is uniform from a viewpoint of preventing stress concentration, the dome cover 11 does not necessarily have uniform thickness. The dome cover 11 is detachably mounted to the camera unit 12, and for example, in a case where a problem, such as cracking, has occurred in the dome cover 11, the dome cover 11 in which the problem has occurred can also be replaced with a new dome cover 11.

The camera unit 12 illustrated in FIGS. 2 and 3 includes an optical system 13 disposed on the back surface side of the dome cover 11, and an imaging element 14 that outputs image data on the basis of imaging light received via the optical system 13. The focal length of the optical system 13 may be fixed or may be variable, and the optical system 13 may constitute a telephoto lens or a standard lens having an angle of view smaller than 90 degrees, or may constitute a wide angle lens having an angle of view of 90 degrees or more.

The camera unit 12 of the present example has a rotating section 18 provided with the optical system 13 and the imaging element 14, and a supporting section 19 that supports the rotating section 18. The rotating section 18 includes a panning part 18a that is rotationally movable in a panning direction P, and a tilting part 18b that is supported by the panning part 18a and is rotationally movable in a tilting direction T. The optical system 13 and the imaging element 14 are provided in the tilting part 18b, and an imaging direction is changed to arbitrary directions by the rotation of the rotating section 18 (the panning part 18a and the tilting part 18b). In this way, the rotating section 18 (the panning part 18a and the tilting part 18b) drives the optical system 13 to function as a direction drive part capable of changing an optical axis direction.

The supporting section 19 is provided with a cover mounting part 15, a control panel 16, and a light emitting part 17.

The cover mounting part 15 is a part on which the dome cover 11 is mounted, and fixedly supports the dome cover 11. The specific configuration of the cover mounting part 15 is not particularly limited, and the cover mounting part 15 may have a groove shape in which the cover opening 11a of the dome cover 11 is fitted, or may have a supporting structure in which the end of the dome cover 11 on the cover opening 11a side is mechanically gripped.

Buttons for operating the camera unit 12 are provided on the control panel 16 and are directly operable by a user. The specific configuration of the control panel 16 is not particularly limited, and may have the arbitrary configurations in which a physical switch, a touch panel, and the like are combined together. Additionally, as will be described below, in a case where the camera unit 12 (dome-type camera 10) is communicable with a separate terminal device, the control panel 16 may be provided with a camera-side communication part that is communicable with a terminal-side communication part.

The light emitting part 17 is a part that performs light emission and non-light-emission in accordance with the state of the camera unit 12, and has a function as a user notification part that notifies a user of the state of the camera unit 12. The light emitting part 17 can notify a user of the state of the camera unit 12 with various patterns of light emission and non-light-emission, for example, can also notify the user of the compatibility between the dome cover 11 and the camera unit 12 as will be described below.

If the dome cover 11 is attached to the camera unit 12 (cover mounting part 15) as illustrated in FIG. 3, the rotating section 18 (the panning part 18a and the tilting part 18b) of the camera unit 12 is accommodated within the dome cover 11. The rotating section 18 disposed within the dome cover 11 is rotationally movable in the panning direction P and the tilting direction T without coming into contact with the dome cover 11.

Figure 4:
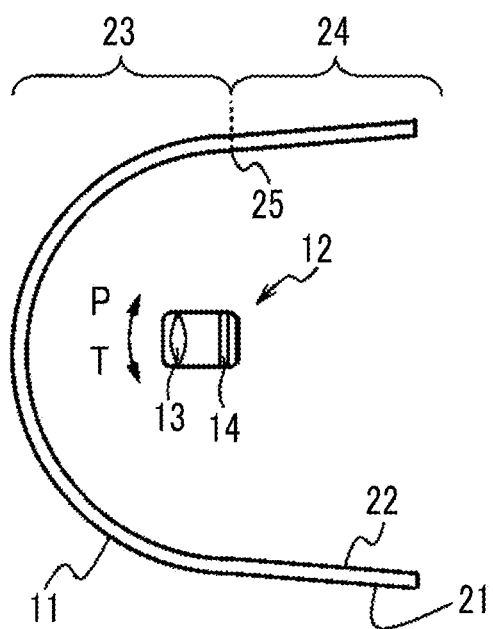
FIG. 4 is a conceptual diagram illustrating an example of a longitudinal-sectional shape of the dome cover having a spherical section and a skirt section.
Figure 5:
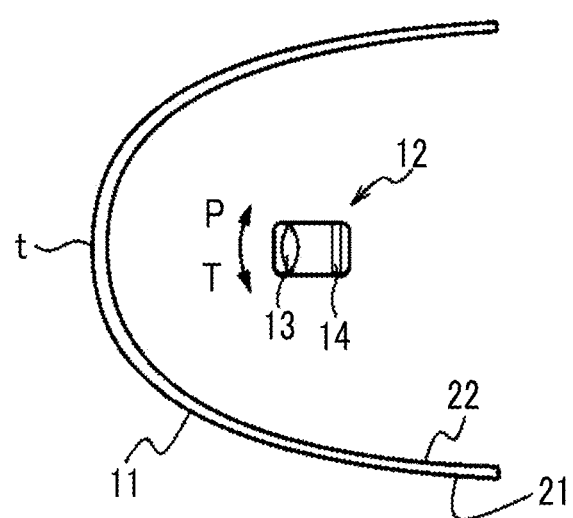
FIG. 5 is a conceptual diagram illustrating an example of a longitudinal-sectional shape of an aspheric dome cover related to the one aspect of the invention.

FIG. 4 is a conceptual diagram illustrating an example of a longitudinal-sectional shape of the dome cover 11 having a spherical section 23 and a skirt section 24. FIG. 5 is a conceptual diagram illustrating an example of a longitudinal-sectional shape of an the dome cover 11 having the aspheric shape related to one aspect of the invention.

The dome cover 11 illustrated in FIG. 4 includes the spherical section 23 in which a front surface 21 and a back surface 22 have a spherical shape, and the skirt section 24 in which the front surface 21 and the back surface 22 have a planar shape (tapered shape), and a discontinuous section 25 is formed at a boundary portion between the spherical section 23 and the skirt section 24. In the discontinuous section 25, optical properties (for example, focal length) are not continuously changed in the spherical section 23 and the skirt section 24 that are adjacent portions of the dome cover 11. For that reason, in a case where imaging is performed by the camera unit 12 disposed within the dome cover 11, image quality degradation, such as image blurring, resulting from the discontinuous section 25 occurs in the image data output from the imaging element 14 that receives the imaging light passing through the discontinuous section 25.

Meanwhile, in the dome cover 11 illustrated in FIG. 5, at least the back surface 22 (in the present example, both surfaces of the front surface 21 and the back surface 22) out of the front surface 21 and the back surface 22 has an aspheric shape that has no discontinuous section (refer to reference sign "25" of FIG. 4) at least at a location other than the top t. Specifically, at least the back surface 22 out of the front surface 21 and the back surface 22 in "at least a portion through which the imaging light contributing to imaging by the camera unit 12 (the optical system 13 and the imaging element 14) passes" in the dome cover 11 has an aspheric shape that has no discontinuous section at a location other than the top t. For that reason, in the image data acquired by imaging being performed in a state where the dome cover 11 illustrated in FIG. 5 is mounted on the camera unit 12, image quality degradation of image blurring resulting from the discontinuous section 25 illustrated in FIG. 4 or the like does not occur naturally.

Figure 6:
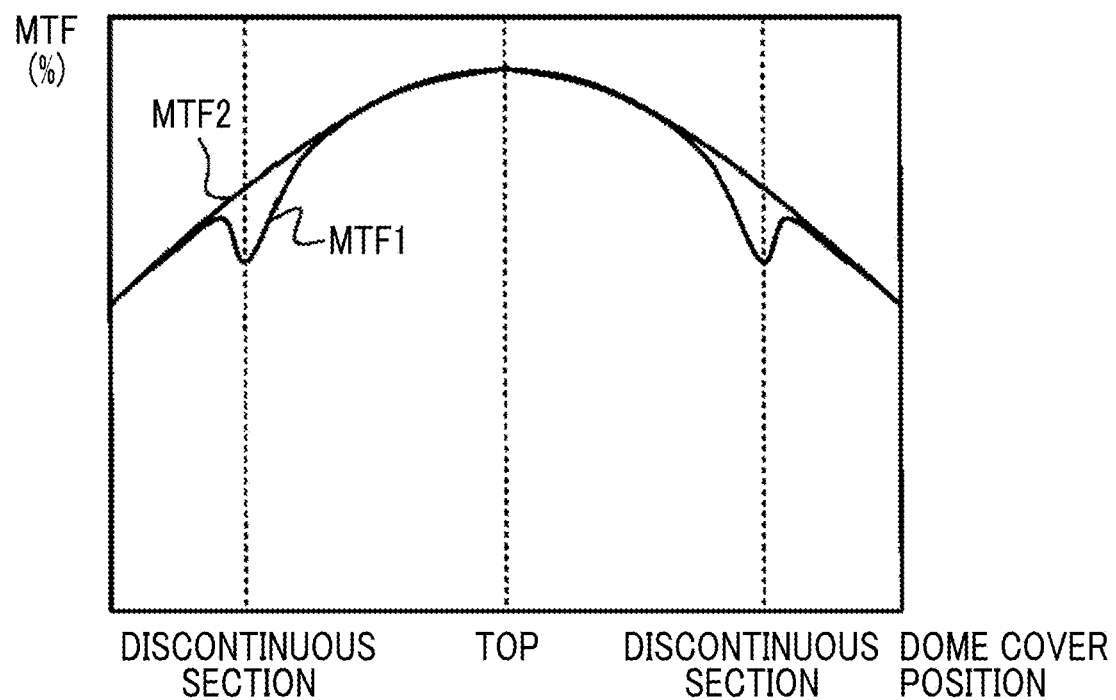
FIG. 6 is a graph illustrating a relationship example between the position of the dome cover and the modulation transfer function (MTF) of the dome cover.

FIG. 6 is a graph illustrating a relationship example between the position of the dome cover 11 and the MTF of the dome cover 11. A horizontal axis of FIG. 6 represents the position in the longitudinal section of the dome cover 11, and the MTF of the top t of the dome cover 11 is illustrated at the center of the horizontal axis with a rotatable range in the tilting direction T (refer to the "top" of FIG. 6) as a reference. A vertical axis of FIG. 6 represents the MTF (%), and shows a higher MTF toward the upper side of FIG. 6.

In FIG. 6, an MTF (refer to "MTF1" of FIG. 6) of the "dome cover 11 having the spherical section 23 and the skirt section 24" illustrated in FIG. 4, and an MTF of the "the dome cover 11 having the aspheric shape" (refer to "MTF2" of FIG. 6) illustrated in FIG. 5 are exemplified. As illustrated in FIG. 4, in a case where the dome cover 11 has the discontinuous section 25, the MTF in the discontinuous section 25 deteriorates (refer to the "MTF1" of the "discontinuous section" of FIG. 6). On the other hand, as illustrated in FIG. 5, in a case where the dome cover 11 has the aspheric shape without having the discontinuous section 25 at least at a location other than the top t, the MTF varies continuously without deteriorating suddenly (refer to the "MTF2" of FIG. 6). In this way, the "the dome cover 11 having the aspheric shape (refer to FIG. 5)" of the present embodiment shows excellent optical properties compared to "the dome cover 11 (refer to FIG. 4) having the spherical section 23 and the skirt section 24" because optical properties, such as the MTF, are stable.

Additionally, according to the dome cover 11 having the aspheric shape illustrated in FIG. 5, it is also easy to optimize the optical properties of the dome cover 11 in accordance with the optical properties of the optical system 13 of the camera unit 12 disposed inside the dome cover 11. That is, in the "dome cover 11 having the spherical section 23 and the skirt section 24" illustrated in FIG. 4, the degree of freedom (hereinafter also referred to as "the degree of freedom of optimization") of the design of the dome cover 11, which does not impair the optical properties of the optical system 13 as much as possible, is very limited. On the other hand, in the "dome cover 11 having the aspheric shape" illustrated in FIG. 5, the discontinuous section that brings about image quality degradation, such as image blurring, is not present or the discontinuous section is limited to the top t of the dome cover 11. Therefore, the degree of freedom of optimization of the dome cover 11 is very large.

The "aspheric shape" of the dome cover 11 as illustrated in FIG. 5 is a shape in which at least the back surface 22 (in the present example, both surfaces of the front surface 21 and the back surface 22) out of the front surface 21 and the back surface 22 is formed by a curved surface that is neither a planar surface nor a spherical surface. The dome cover 11 of the present embodiment may have such an aspheric shape and may have no discontinuous section at a location other than at least the top t on at least the back surface 22 (in the present example, both surfaces of the front surface 21 and the back surface 22) out of the front surface 21 and the back surface 22, and the unique shape thereof is not particularly limited. For example, the front surface 21 and the back surface 22 of the dome cover 11 having the aspheric shape illustrated in FIG. 5 may be derived by being respectively fitted to the front surface 21 and the back surface 22 of "the dome cover 11 having the spherical section 23 and the skirt section 24" illustrated in FIG. 4 by arbitrary techniques. For that reason, the dome cover 11 in which at least the back surface 22 out of the front surface 21 and the back surface 22 have an elliptical shape or a hyperelliptical shape can be used as the dome cover 11 having the aspheric shape.

Figure 7:
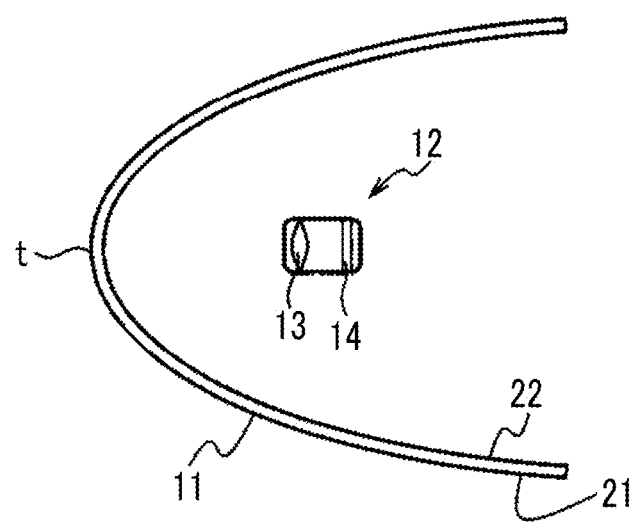
FIG. 7 is a conceptual diagram illustrating an example of a longitudinal-sectional shape of an elliptical dome cover related to the one aspect of the invention.
Figure 8:
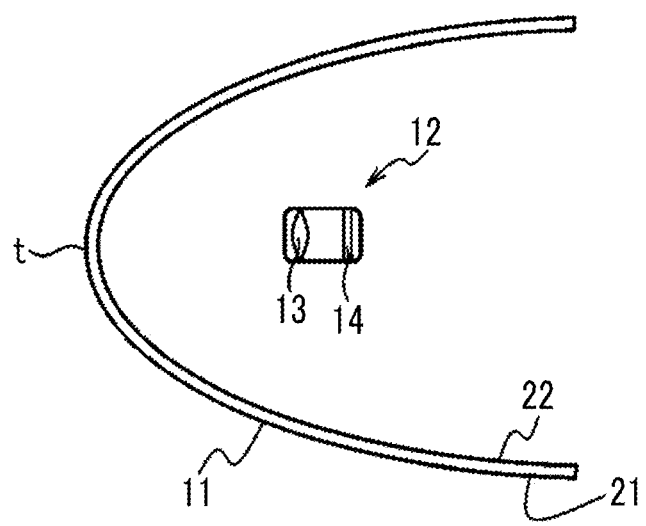
FIG. 8 is a conceptual diagram illustrating an example of a longitudinal-sectional shape of a hyperelliptical dome cover related to the one aspect of the invention.

FIG. 7 is a conceptual diagram illustrating an example of a longitudinal-sectional shape of an elliptical dome cover 11 related to the one aspect of the invention. FIG. 8 is a conceptual diagram illustrating an example of a longitudinal-sectional shape of a hyperelliptical dome cover 11 related to the one aspect of the invention. In at least the back surface 22 (in the present example, both surfaces of the front surface 21 and the back surface 22) out of the front surface 21 and the back surface 22 of the dome cover 11, the shape in the longitudinal section of the dome cover 11 may be the elliptical as illustrates in FIG. 7 or may be the hyperelliptical shape as illustrated in FIG. 8. That is, the longitudinal-sectional shape of at least the back surface 22 (in the present example, both surfaces of the front surface 21 and the back surface 22) out of the front surface 21 and the back surface 22 of the dome cover 11 may be made to coincide withy a hyperelliptical circle expressed by the following Equation 1 and drawn on an XY plane or a hyperelliptical circle expressed by the following Equation 2 and drawn on the XY plane.

$$(x/a)^2 + (y/b)^2 = 1 \quad \text{Equation 1}$$

$$(|x|/a)^p + (|y|/b)^p = 1 \quad \text{Equation 2}$$

Where "a>0", "b>0", and "p>2" are satisfied.

Figure 9:
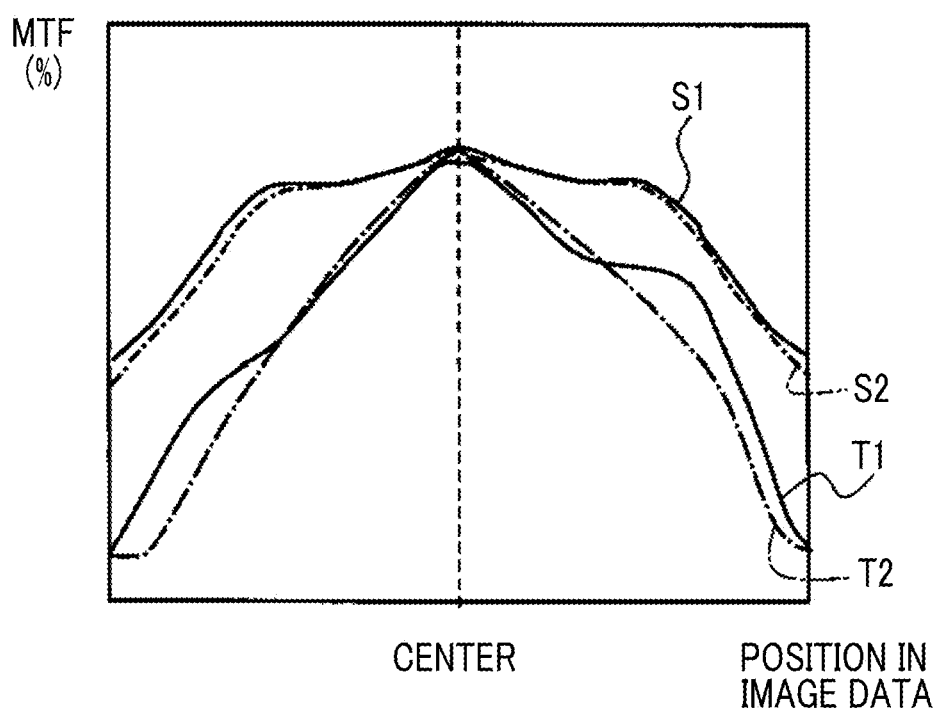
FIG. 9 is a graph illustrating a relationship example between position in image data and MTF derived from the image data.

FIG. 9 is a graph illustrating a relationship example between position in image data and MTF (%) derived from the image data. A horizontal axis of FIG. 9 represents the position in the image data (the position of the image data in a horizontal direction in the present example), a mark of the "center" of the horizontal axis corresponds to an image center, and both ends of the horizontal axis correspond to image ends. Reference sign "S1" of FIG. 9 represents the MTF of the image data, which is acquired by imaging using the dome cover 11 having the aspheric shape illustrated in FIG. 5, in a sagittal direction, and reference sign "T1" of FIG. 9 represents the MTF of the image data, which is acquired by imaging using the dome cover 11 having the aspheric shape illustrated in FIG. 5, in a tangential direction. Similarly, the MTF of the image data, which is acquired by imaging using the dome cover 11 having the elliptical shape illustrated in FIG. 7, in the sagital direction, is represented by reference sign "S2", and the MTF in the tangential direction is represented by reference sign "T2".

The MTFs represented by reference sign "S2" and "T2" are data on the dome cover 11 having the elliptical shape in which the longitudinal section of the front surface 21 satisfies "a=72.707" and "b=30.325" in the above Equation 1 and the longitudinal section of the back surface 22 satisfies "a=69.355" and "b=28.734" in the above Equation 1.

Figure 10:
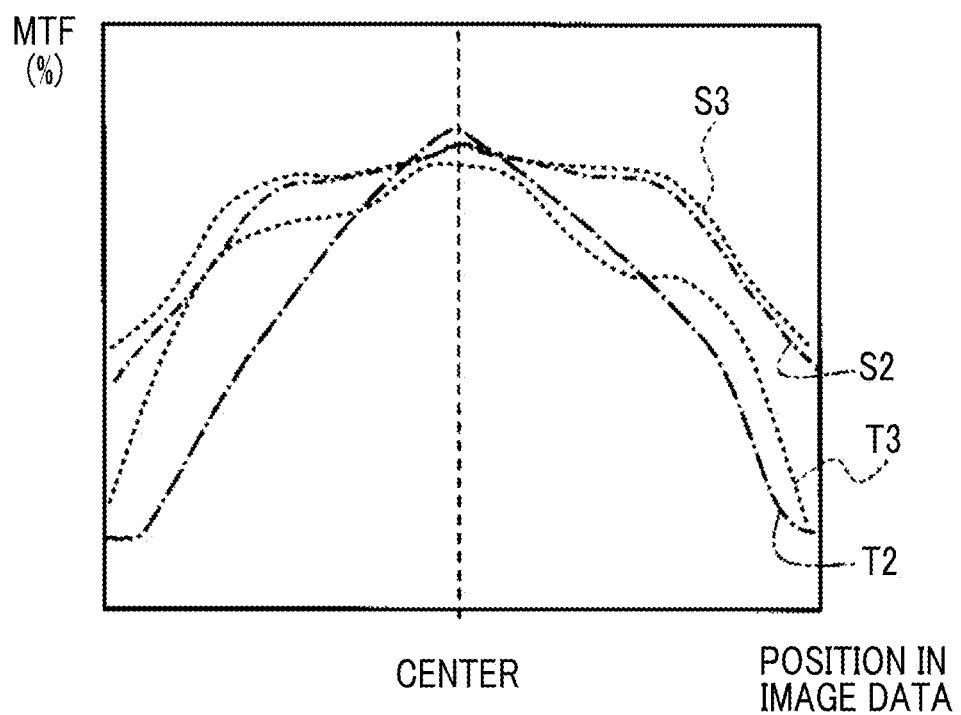
FIG. 10 is a graph illustrating a relationship example between the position in image data and the MTF derived from the image data.

FIG. 10 is a graph illustrating a relationship example between position in image data and MTF (%) derived from the image data. Reference sign "S3" of FIG. 10 represents the MTF of the image data, which is acquired by imaging using the dome cover 11 having the hyperelliptical shape illustrated in FIG. 8, in the sagittal direction, and reference sign "T3" of FIG. 10 represents the MTF of the image data, which is acquired by imaging using the dome cover 11 having the hyperelliptical shape illustrated in FIG. 8, in the tangential direction.

The MTFs represented by reference sign "S3" and "T3" are data on the dome cover 11 having the hyperelliptical shape in which the longitudinal section of the front surface 21 satisfies "a=80.819", "b=30.524", and "p=2.154" in the above Equation 2 and the longitudinal section of the back surface 22 satisfies "a=75.021", "b=28.818", and "p=2.149" in the above Equation 2.

In addition, the data illustrated in FIGS. 9 and 10 is based on the image data acquired by imaging at "tilt angle=40 degrees" in a case where the tilt angle at which the optical axis of the optical system 13 passes through the top t of the dome cover 11 is set to "0 degree". Additionally, the front surface 21 and the back surface 22 of each of the "dome cover 11 having the aspheric shape", the "dome cover 11 having the elliptical shape", and the "dome cover 11 having the hyperelliptical shape" that become the basis for the data illustrated in FIGS. 9 and 10 are derived by fitting, having the front surface 21 and the back surface 22 of the same "dome cover 11 (refer to FIG. 4) having the spherical section 23 and the skirt section 24" as references, respectively.

In this way, the dome cover 11 in which the longitudinal-sectional shape has the aspheric shape, such as an elliptical shape or a hyperelliptical shape, stably exhibits excellent optical properties without suddenly deteriorating optical properties, such as the MTF, like the dome cover 11 (refer to FIG. 4) including the discontinuous section 25. Particularly, in the example illustrated in FIGS. 9 and 10, "the dome cover 11 having the hyperelliptical shape" exhibits an excellent MTF more than "the dome cover 11 having the elliptical shape".

Next, a specific working example will be described. First, the working example of "the dome cover 11 (refer to FIG. 4) having the spherical section 23 and the skirt section 24" will be described.

Figure 11:
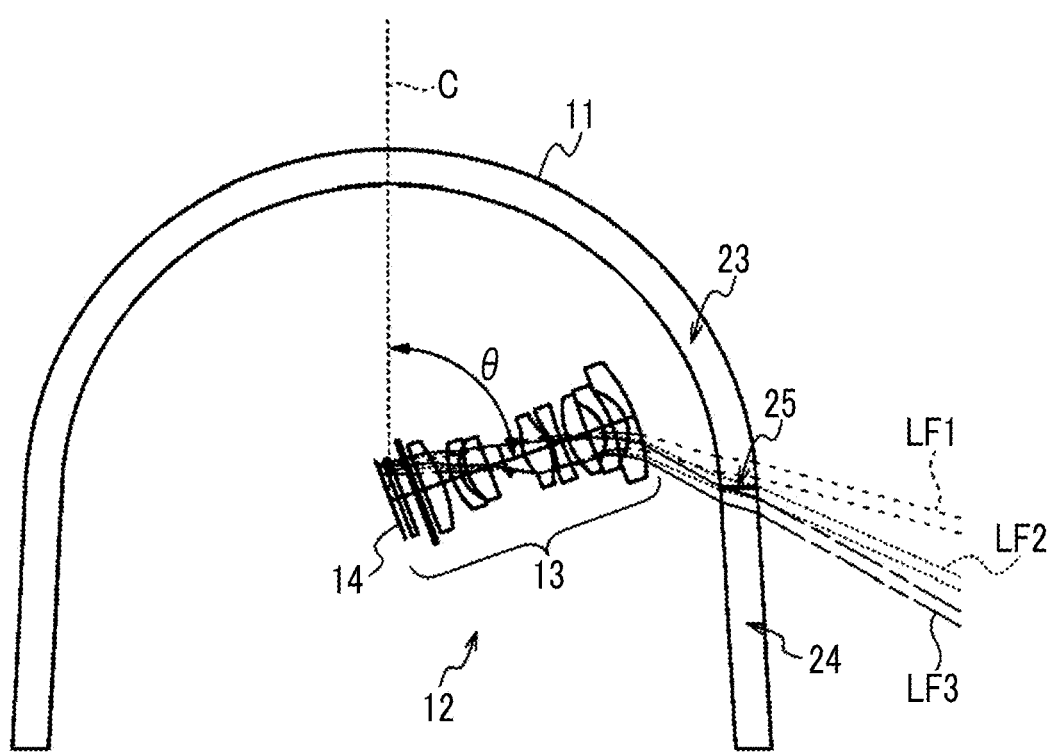
FIG. 11 illustrates an optical path diagram of beams that pass through the dome cover having the spherical section and the skirt section, and an optical system and are received by an imaging element.

FIG. 11 illustrates an optical path diagram of beams that pass through the dome cover 11 having the spherical section 23 and the skirt section 24 and the optical system 13 and are received by the imaging element 14. In FIG. 11, a "first beam LF1" passes through only the spherical section 23 of the dome cover 11, a "second beam LF2" passes through both the spherical section 23 and skirt section 24 of the dome cover 11, and a "third beam LF3" passes through only the skirt section 24 of the dome cover 11. In addition, all of the first beam LF1, the second beam LF2, and the third beam LF3 represent beams from a point subject and are focused on point images ideally on an imaging surface of the imaging element 14.

Figure 12A:
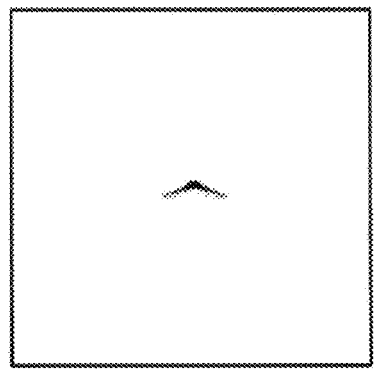
FIGS. 12A to 12C are views illustrating the image data of respective beams illustrated in FIG. 11.
Figure 12B:
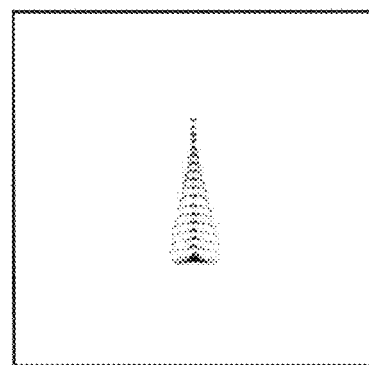
Figure 12C:
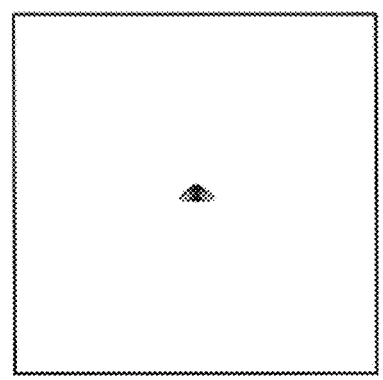

FIGS. 12A to 12C are views illustrating the image data of the respective beams illustrated in FIG. 11, FIG. 12A illustrates an image of the first beam LF1, FIG. 12B illustrates an image of the second beam LF2, and FIG. 12C illustrates an image of the third beam LF3. As illustrated in FIGS. 12A and 12C, the image (refer to FIG. 12A) of the first beam LF1 that passes only through a location (in the present example, the spherical section 23 or the skirt section 24) showing continuous optical properties in the dome cover 11 and does not pass through the discontinuous section 25, and the image (refer to FIG. 12C) of the third beam LF3 become images that are relatively close to ideal point images, respectively. On the other hand, the image (refer to FIG. 12B) of the second beam LF2 that passes through the discontinuous section 25 does not become a point image, and becomes an image (an image that widens in the longitudinal direction in the example illustrated in the FIG. 12B) that widens broadly.

Figure 13A:
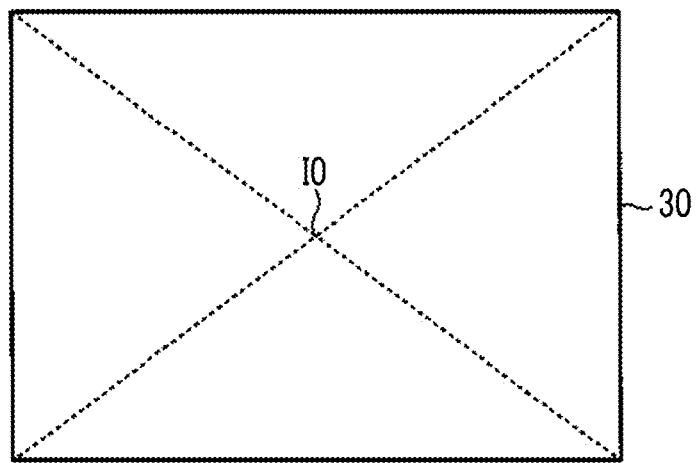
FIGS. 13A and 13B are views for explaining the MTF derived from the image data acquired by imaging using the dome cover illustrated in FIG. 11.
Figure 13B:
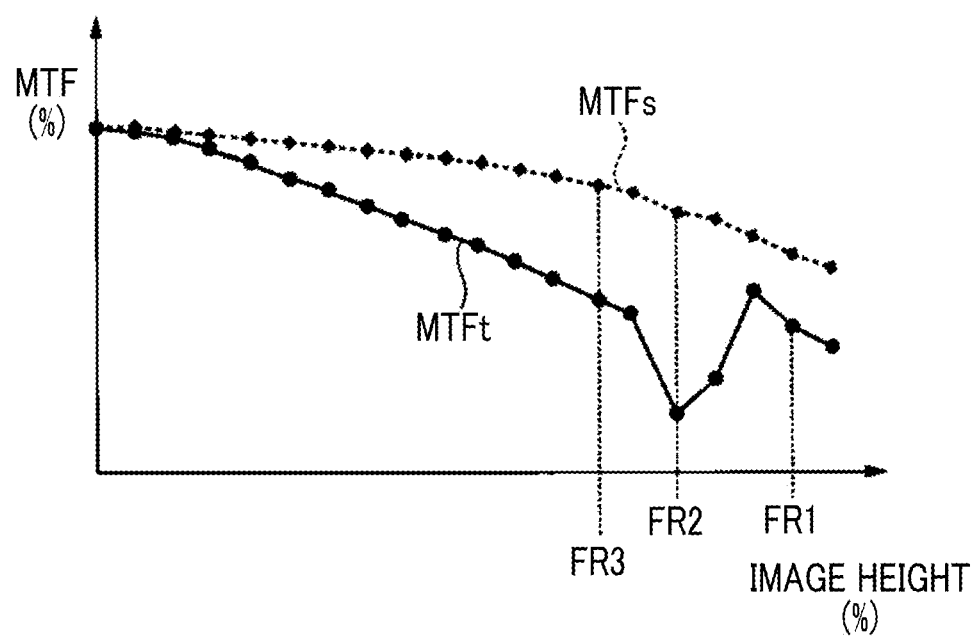

FIGS. 13A and 13B are views for explaining the MTF (%) derived from image data 30 acquired by imaging using the dome cover 11 illustrated in FIG. 11, FIG. 13A illustrates a plan view of the image data 30, and FIG. 13B is a view illustrating a relationship example between the image height of the image data, and the MTF. The image height (%) of FIG. 13B represents the percentage (%) of "a distance from the center (image center 10) of the image data 30" with respect to "a distance from the center (image center 10) of the image data 30 to four corners of the image data 30". For example, the position of the four corners of the image data 30 becomes "image height=100%", and the image center 10 becomes "image height=0%".

In the example illustrated in FIG. 13B, "FR1" represents the MTF of the image (refer to FIG. 12A) of the first beam LF1 of FIG. 11, "FR2" represents the MTF of the image (refer to FIG. 12B) of the second beam LF2 of FIG. 11, and "FR3" represents the MTF of the image (refer to FIG. 12C) of the third beam LF3 of FIG. 11. Additionally, in FIG. 13B, the MTF in the sagittal direction is represented by "MTFs" and the MTF in the tangential direction is represented by "MTFt". In addition, data in a case where a tilt angle θ of the camera unit 12 of FIG. 11 is 70 degrees is illustrated in FIG. 13B.

As illustrated in FIG. 13B, in the present example, the MTF (refer to "FR2") of the image of the second beam LF2 deteriorates compared to the MTFs (refer to "FR1" and "FR3") of the images of the first beam LF1 and the third beam LF3, especially the MTF (refer to "MTFt") of the tangential direction deteriorates further than the MTF (refer to "MTFs") in the sagittal direction.

Figure 14:
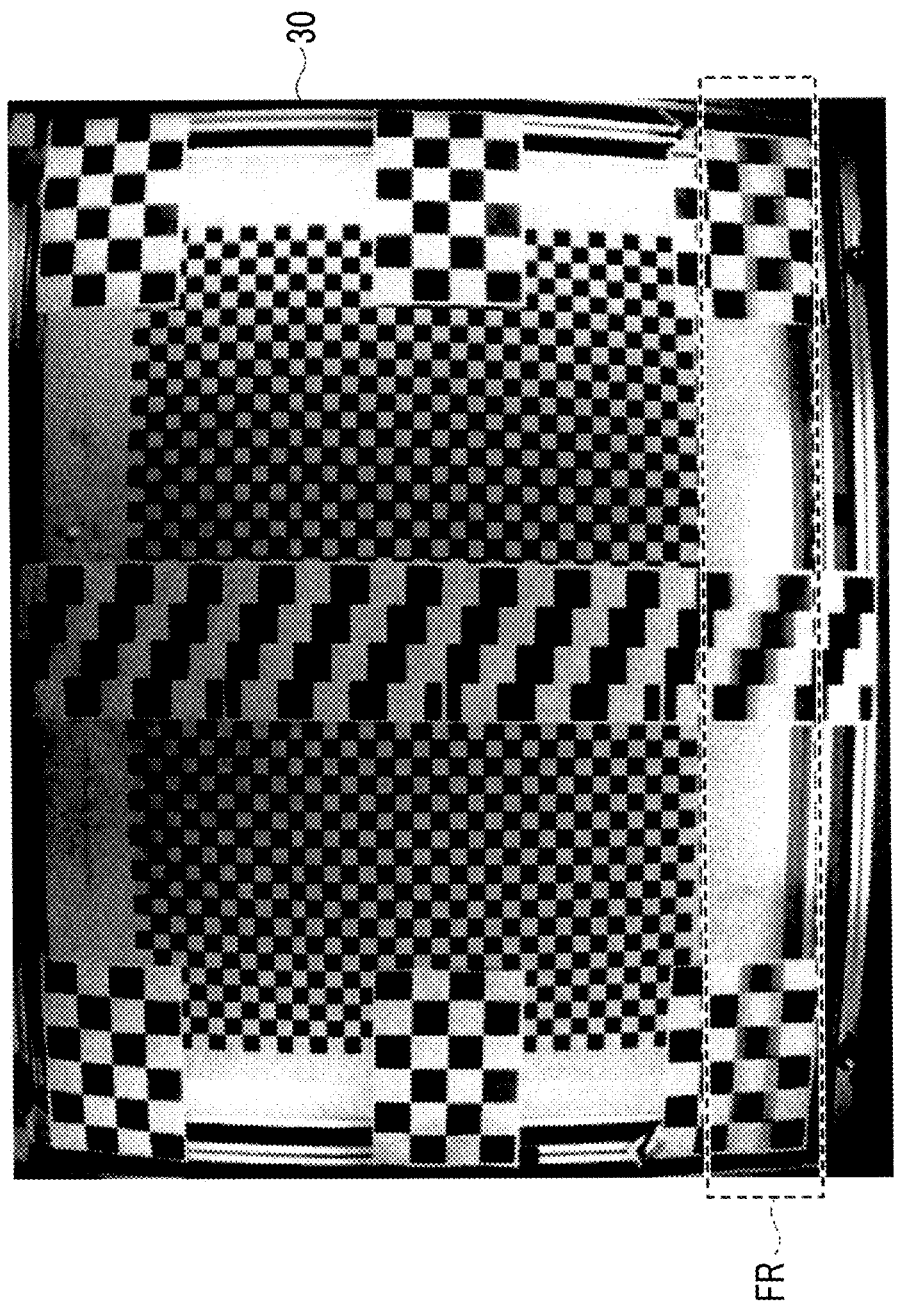
FIG. 14 is a view illustrating an example of a degradation region brought about due to a discontinuous section of the dome cover in the image data.

FIG. 14 is a view illustrating an example of a degradation region FR brought about due to the discontinuous section 25 of the dome cover 11 in the image data 30. In the present example, the discontinuous section 25 is constituted by a boundary region between the spherical section 23 and the skirt section 24 of the dome cover 11. Hence, in a case where the discontinuous section 25 is included within the image portion of the camera unit 12 (the optical system 13 and the imaging element 14), a beltlike degradation region FR that is an image portion of the light passing through the discontinuous section 25 is included in the image data 30. In the present example, the image of the second beam LF2 passing through the discontinuous section 25 becomes an image that widens in the longitudinal direction without becoming a point image (refer to FIG. 12B). Therefore, an image in the degradation region FR has blurred image quality in which sharpness deteriorates.

Figure 15:
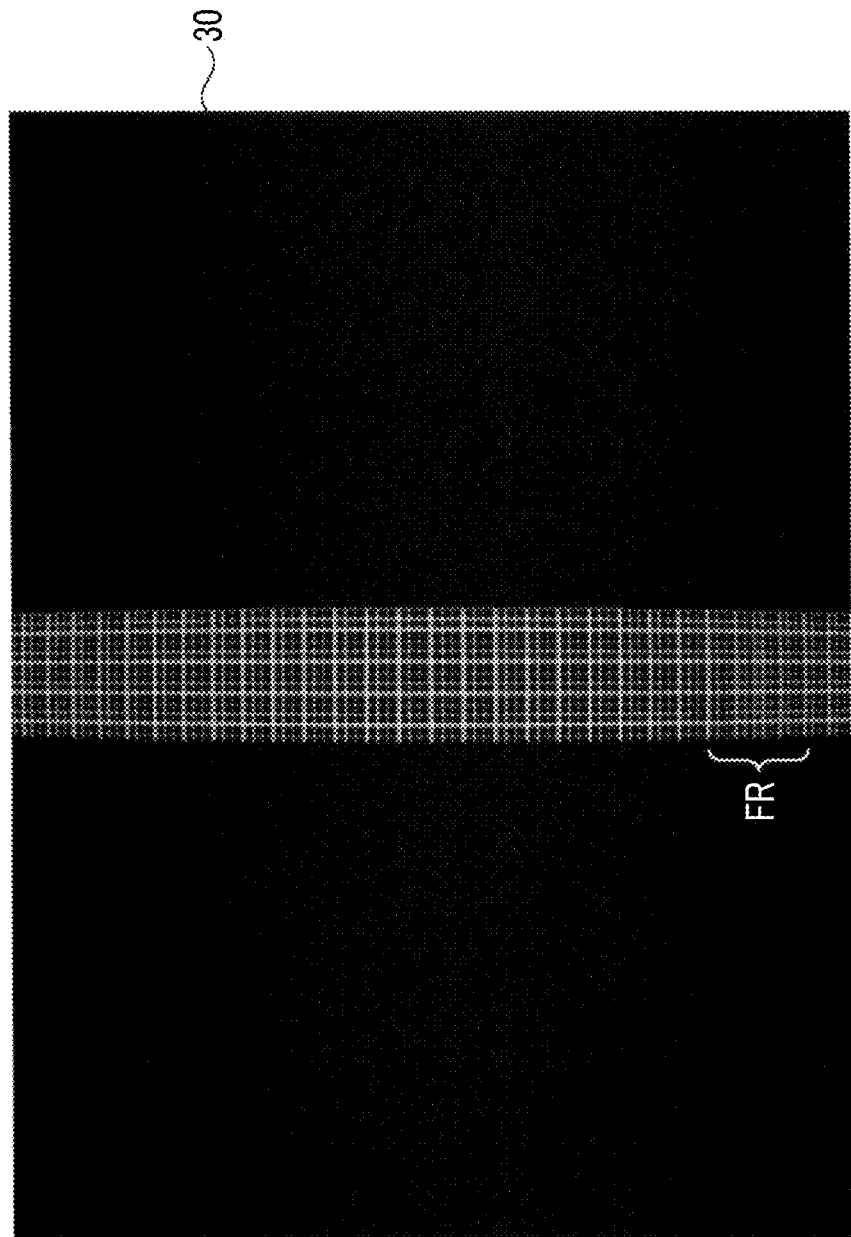
FIG. 15 is a view illustrating an example of the image data acquired by imaging using the dome cover illustrated in FIG. 11.
Figure 16:
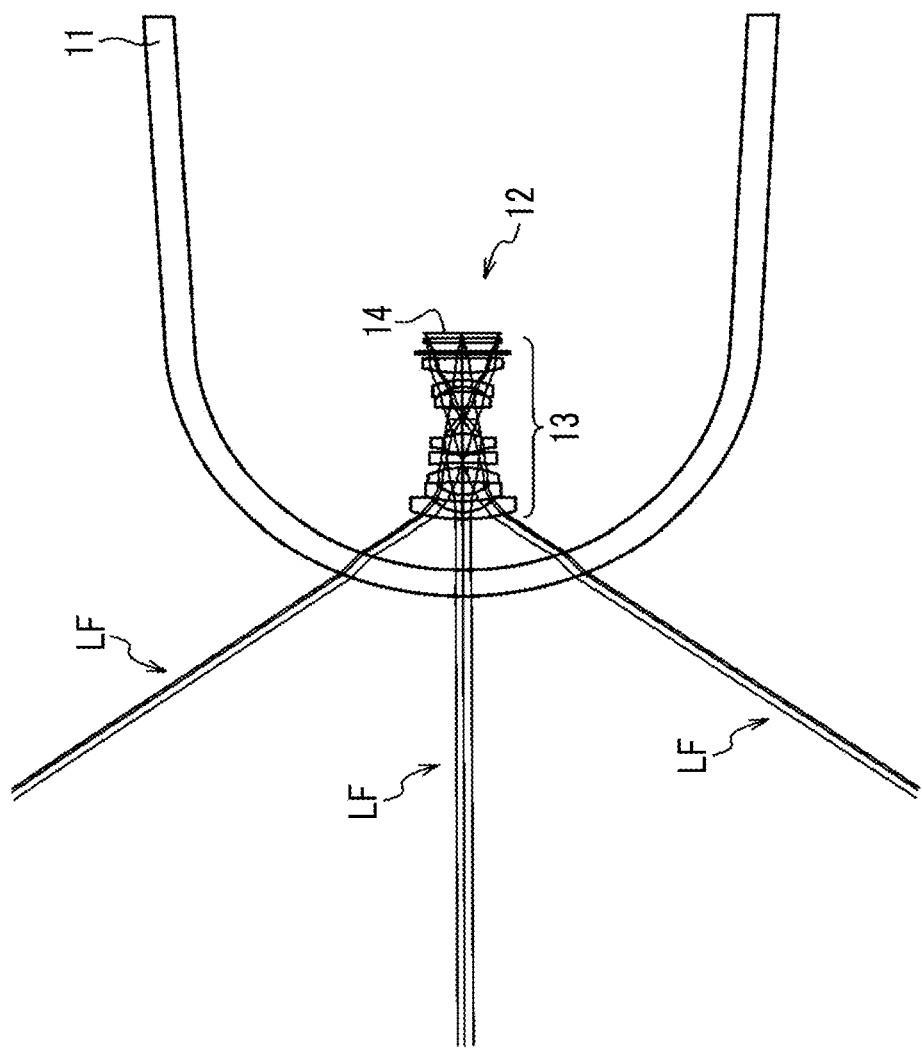
FIG. 16 illustrates an optical path diagram in a case where the dome cover illustrated in FIG. 11 is mounted on the camera unit, and an optical path diagram in a case where tilt angle is 0 degree.
Figure 17:
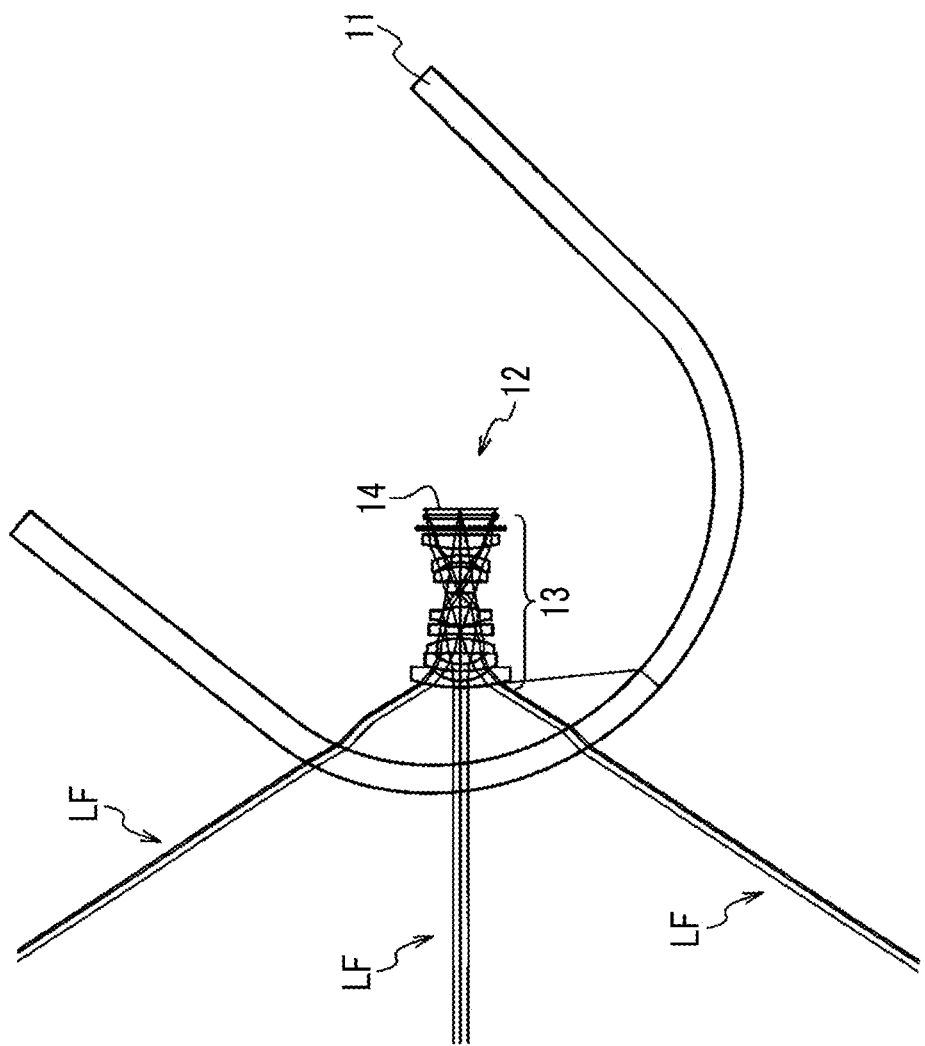
FIG. 17 illustrates an optical path diagram in a case where the dome cover illustrated in FIG. 11 is mounted on the camera unit, and an optical path diagram in a case where the tilt angle is 45 degree.
Figure 18:
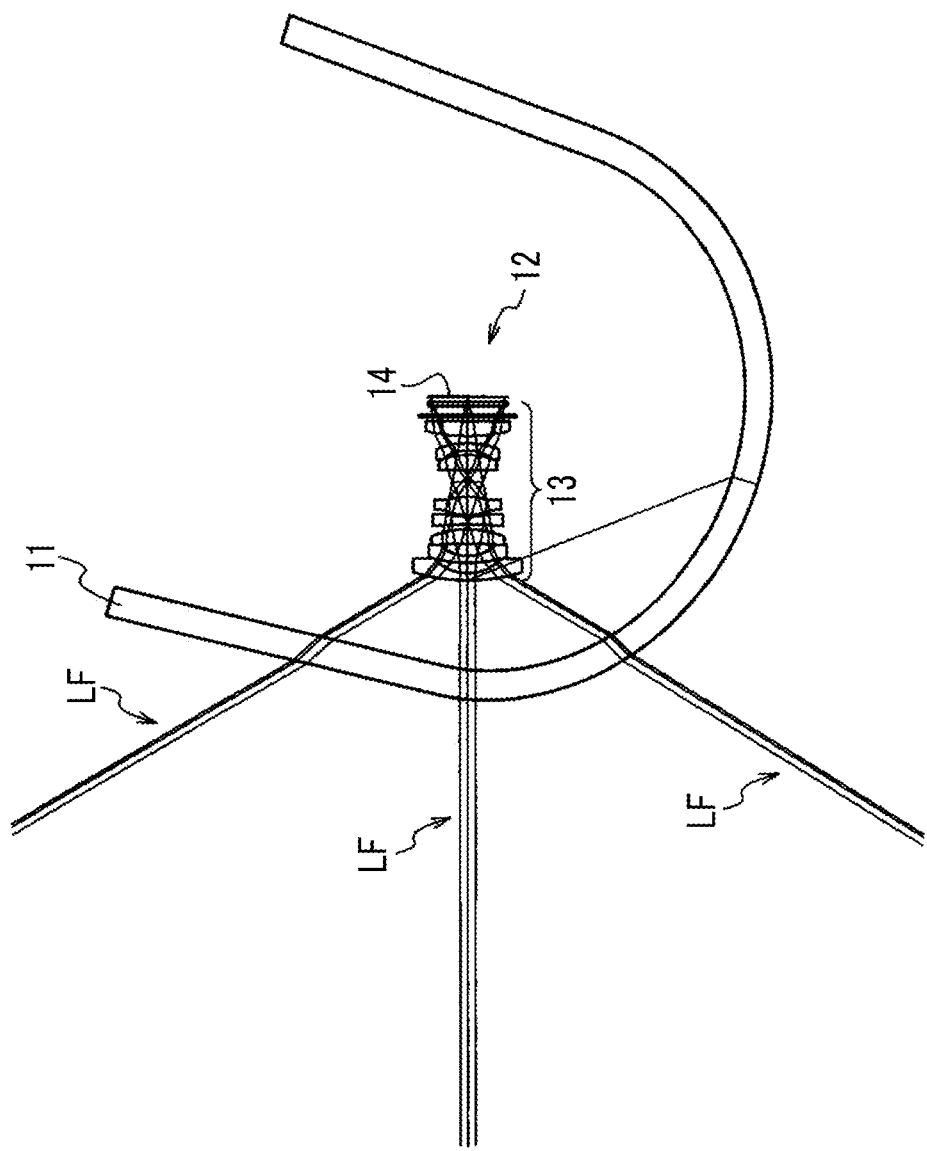
FIG. 18 illustrates an optical path diagram in a case where the dome cover illustrated in FIG. 11 is mounted on the camera unit, and an optical path diagram in a case where the tilt angle is 70 degree.

FIG. 15 is a view illustrating an example of the image data 30 acquired by imaging using the dome cover 11 illustrated in FIG. 11. As can also be from FIG. 15, the sharpness of the degradation region FR of the image data 30 deteriorates further than other regions.

Figure 19:
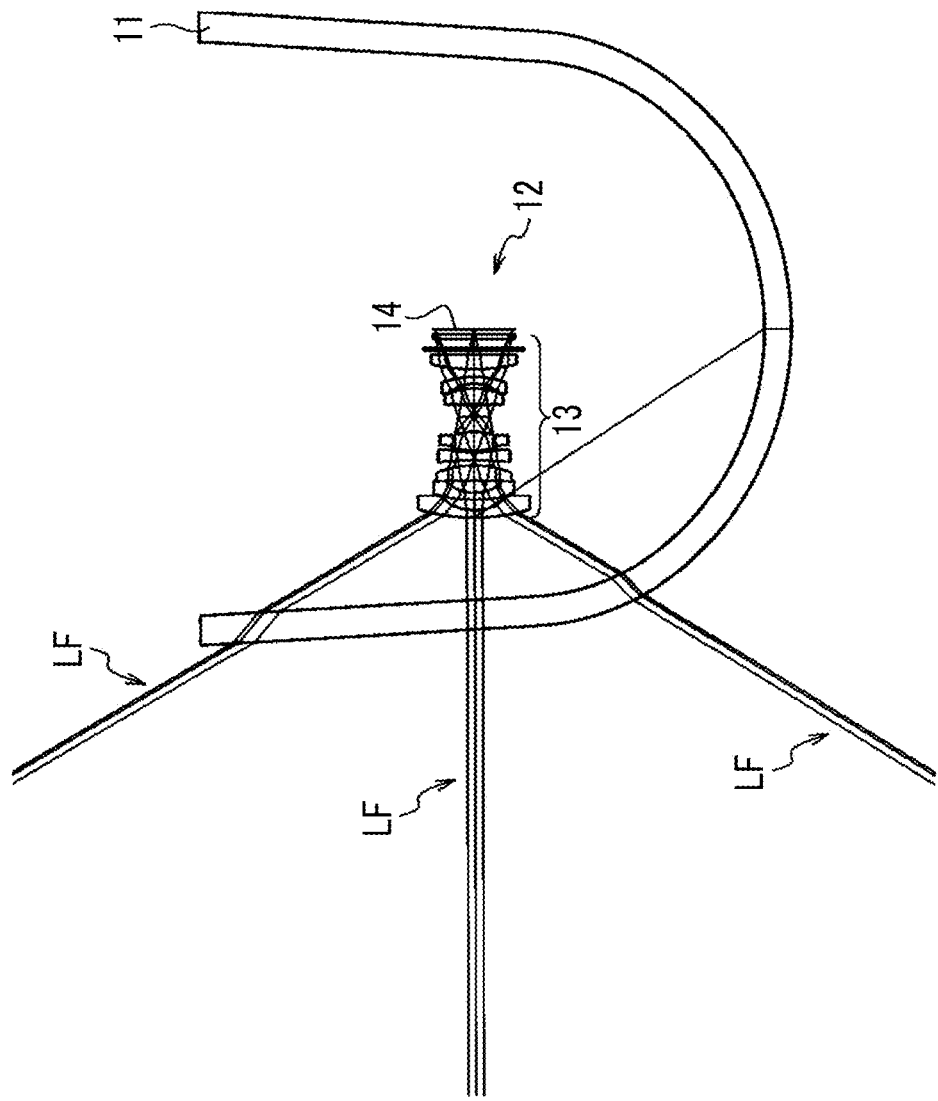
FIG. 19 illustrates an optical path diagram in a case where the dome cover illustrated in FIG. 11 is mounted on the camera unit, and an optical path diagram in a case where the tilt angle is 90 degree.

FIGS. 16 to 19 illustrate optical path diagrams in a case where the dome cover 11 illustrated in FIG. 11 is mounted on the camera unit 12, and illustrate optical path diagrams in a case where the tilt angles (refer to reference sign "θ" of FIG. 11) are 0 degree (refer to FIG. 16), 45 degrees (refer to FIG. 17), 70 degrees (refer to FIG. 18), and 90 degrees (refer to FIG. 19). As illustrated in FIGS. 16 to 19, the tilt angle at which a beam LF passing through the discontinuous section 25 of the dome cover 11 is received by the imaging element 14 fluctuates not only at the position of the discontinuous section 25 in the dome cover 11 but also the position of the camera unit 12 (the optical system 13 and the imaging element 14) relative to the dome cover 11 (the discontinuous section 25).

Next, a working example "the dome cover 11 (refer to FIG. 5) having the aspheric shape" will be described.

Figure 20:
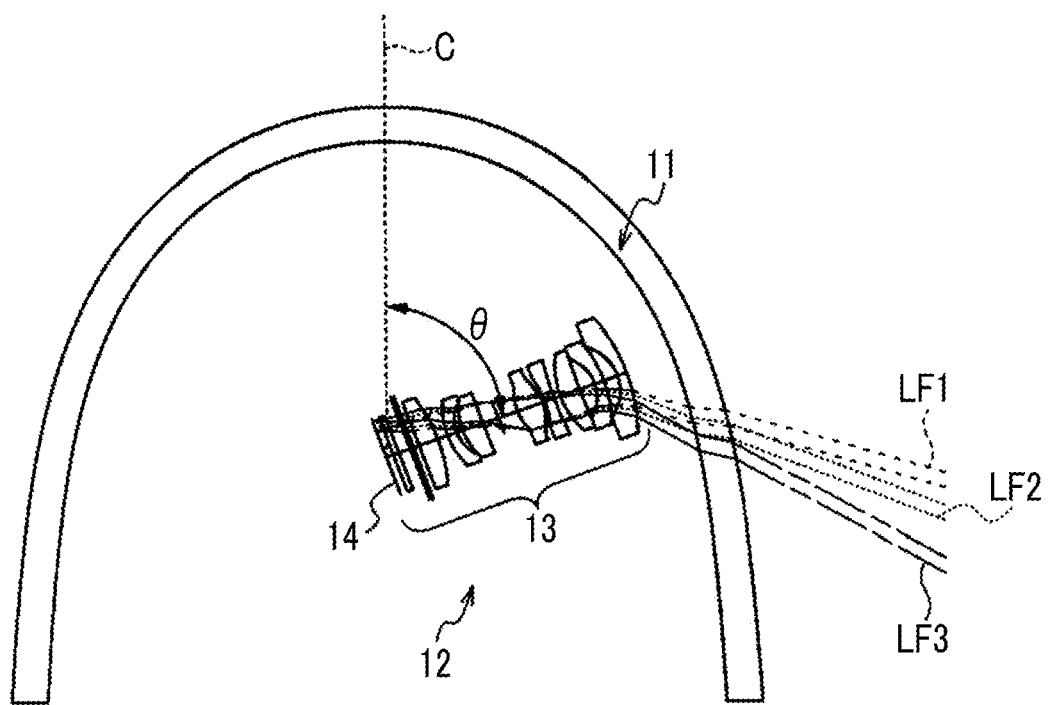
FIG. 20 illustrates an optical path diagram of beams that pass through the dome cover having the aspheric shape and the optical system and are received by the imaging element.

FIG. 20 illustrates an optical path diagram of beams that pass through the dome cover 11 having the aspheric shape and the optical system 13 and are received by the imaging element 14. A "first beam LF1", "a second beam LF2", and a "third beam LF3" in FIG. 20 represent beams from the same point subject as the "first beam LF1", the "second beam LF2", and the "third beam LF3" in FIG. 11, respectively.

Figure 21A:
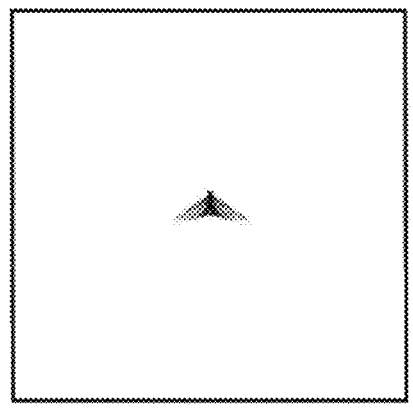
FIGS. 21A to 21C are views illustrating the image data of respective beams illustrated in FIG. 20.
Figure 21B:
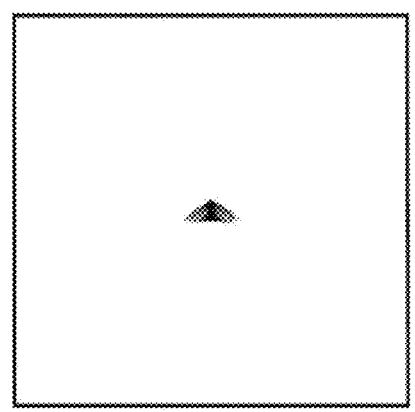
Figure 21C:
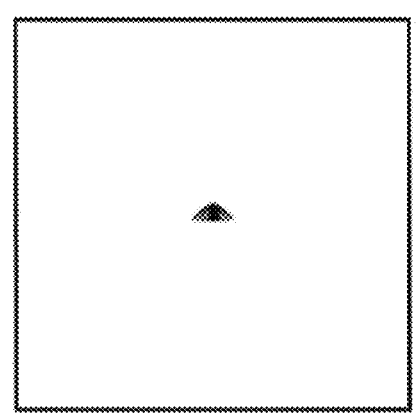

FIGS. 21A to 11C are views illustrating the image data of the respective beams illustrated in FIG. 20, FIG. 21A illustrates an image of the first beam LF1, FIG. 21B illustrates an image of the second beam LF2, and FIG. 21C illustrates an image of the third beam LF3. As illustrated in FIG. 21A to FIG. 21C, in the present example, all the images of the first beam LF1, the second beam LF2, and the third beam LF3 become images that are relatively close to ideal point images.

Figure 22:
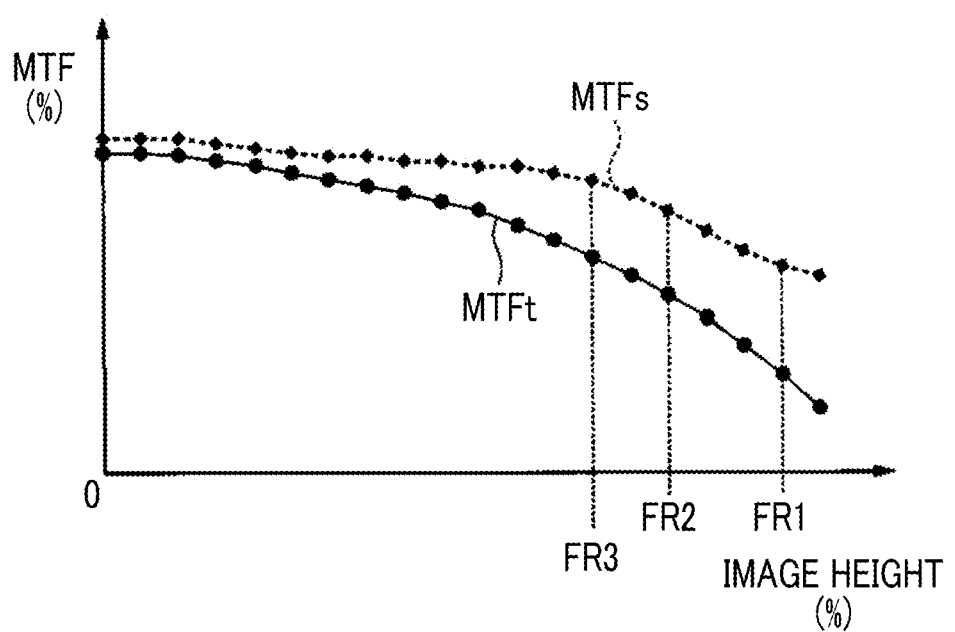
FIG. 22 is a view for explaining the MTF derived from the image data acquired by imaging using the dome cover illustrated in FIG. 20, and a view illustrating a relationship example between the image height of the image data, and the MTF.
Figure 23:
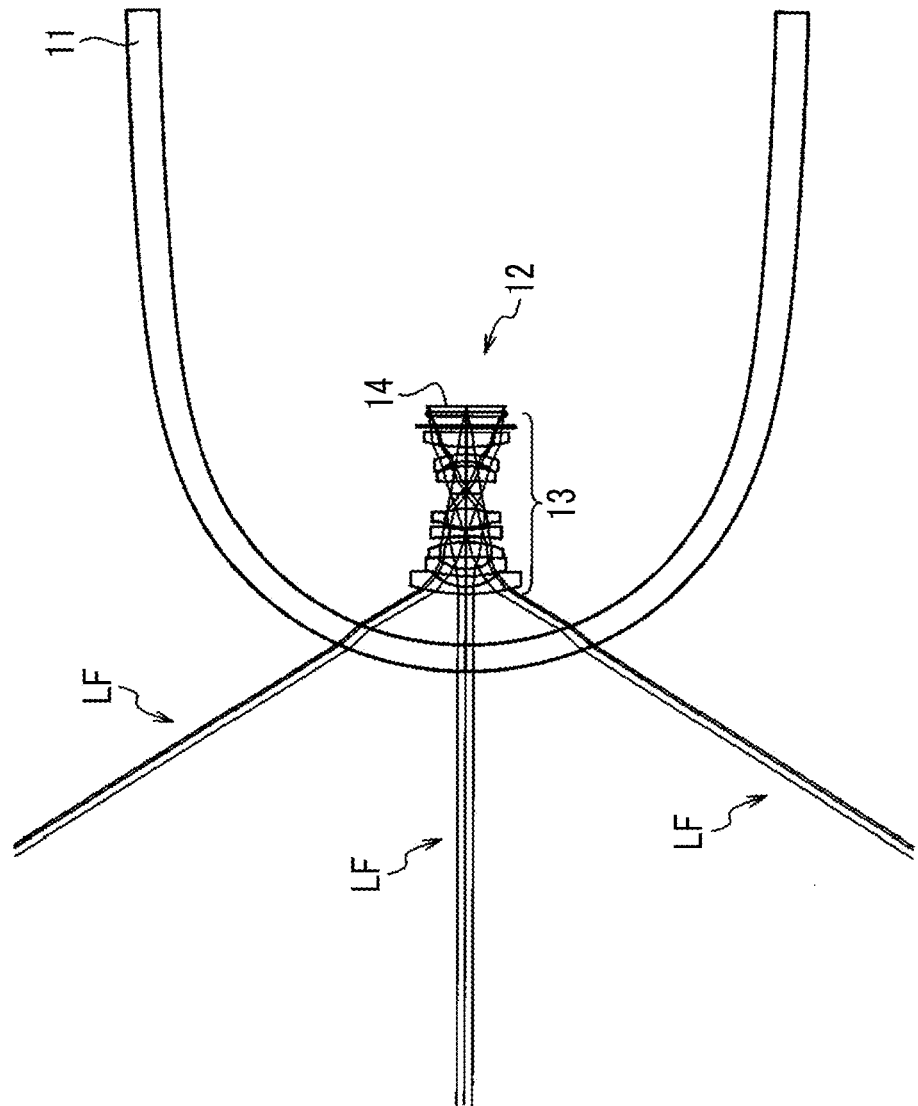
FIG. 23 illustrates an optical path diagram in a case where the dome cover illustrated in FIG. 20 is mounted on the camera unit, and an optical path diagram in a case where the tilt angle is 0 degree.
Figure 24:
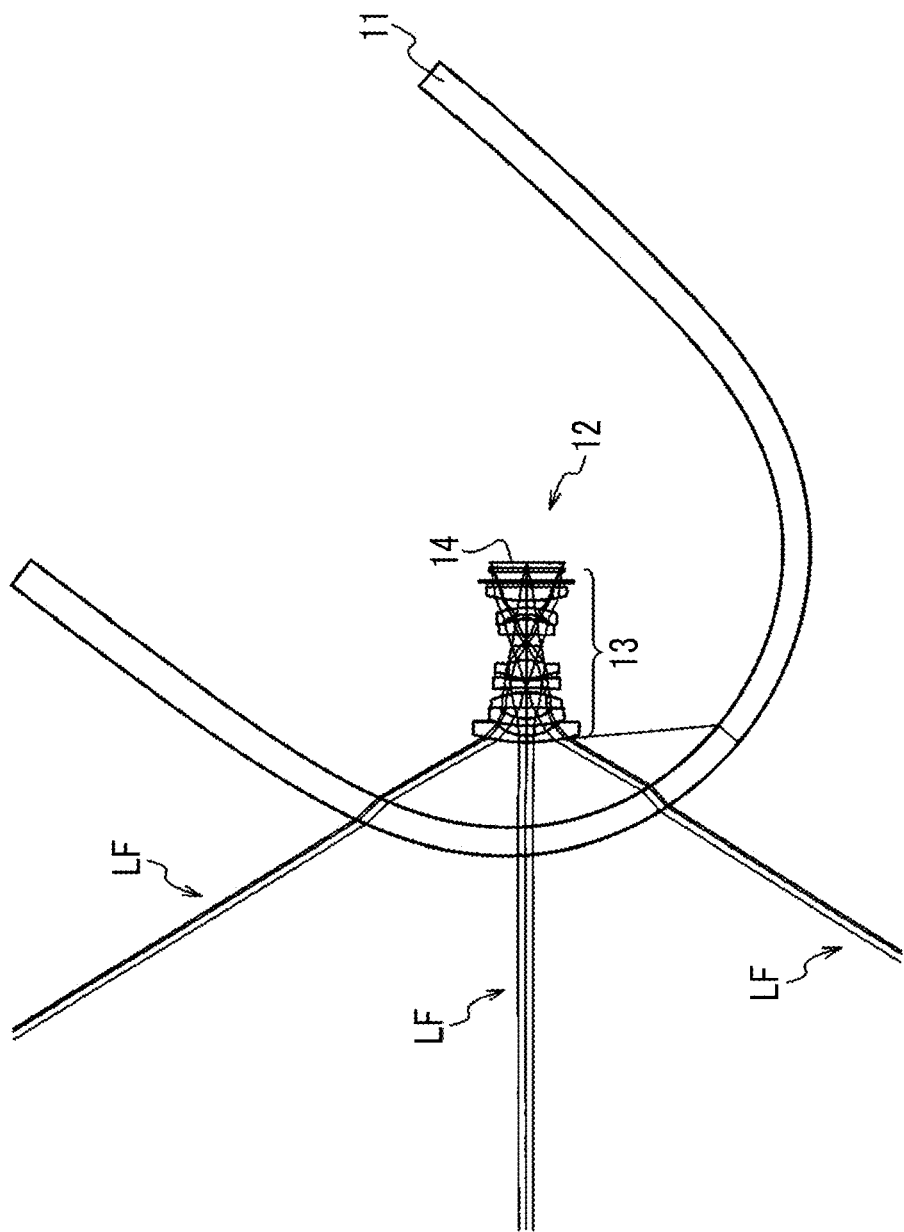
FIG. 24 illustrates an optical path diagram in a case where the dome cover illustrated in FIG. 20 is mounted on the camera unit, and an optical path diagram in a case where the tilt angle is 45 degree.
Figure 25:
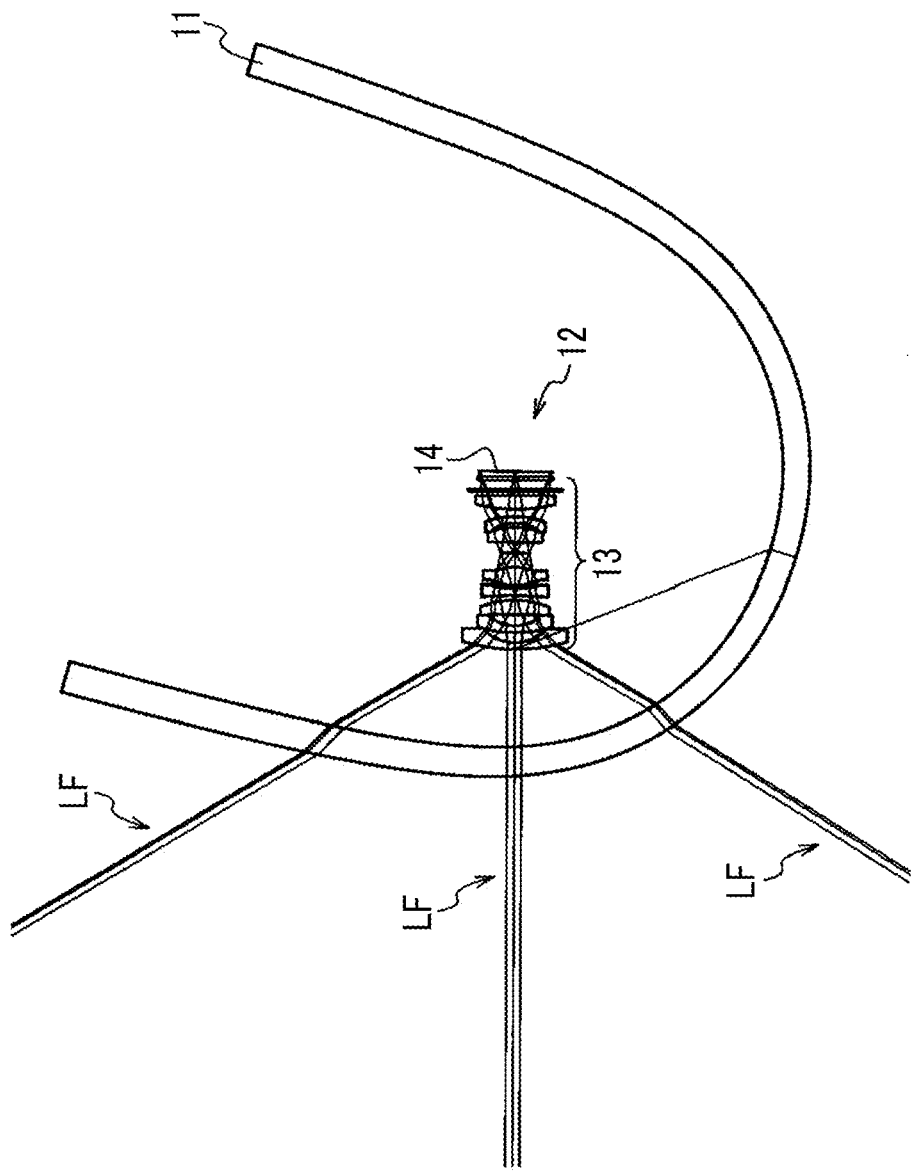
FIG. 25 illustrates an optical path diagram in a case where the dome cover illustrated in FIG. 20 is mounted on the camera unit, and an optical path diagram in a case where the tilt angle is 70 degree.

FIG. 22 is a view for explaining the MTF (%) derived from the image data 30 acquired by imaging using the dome cover 11 illustrated in FIG. 20, and a view illustrating a relationship example between the image height (%) of the image data, and the MTF (%). Similarly to the image height (%) of FIG. 13B, the image height (%) of FIG. 22 represents the percentage (%) of "a distance from the center (image center 10) of the image data 30" with respect to "a distance from the center (image center 10) of the image data 30 to four corners of the image data 30". Additionally, in the example illustrated in FIG. 22, "FR1" represents the MTF of the image (refer to FIG. 21A) of the first beam LF1 of FIG. 20, "FR2" represents the MTF of the image (refer to FIG. 21B) of the second beam LF2 of FIG. 20, and "FR3" represents the MTF of the image (refer to FIG. 21C) of the third beam LF3 of FIG. 20. Additionally, in FIG. 22, the MTF in the sagittal direction is represented by "MTFs" and the MTF in the tangential direction is represented by "MTFt". In addition, data in a case where the tilt angle θ of the camera unit 12 of FIG. 20 is 70 degrees is illustrated in FIG. 22.

As illustrated in FIG. 22, in the present example, the MTFs (refer to "FR1" to "FR3") of the images of the first beam LF1, the second beam LF2, and the third beam LF3 varies continuously, and the MTFs vary continuously from the image center (image height=0%) toward an image circumferential edge (image height=100%) irrespective of the sagittal direction and the tangential direction.

In this way, according to the "dome cover 11 (refer to FIG. 20) having the aspheric shape" having no discontinuous section 25, the image quality properties of the image data 30 also vary continuously in accordance with optical properties, such as the continuously varying MTF of the dome cover 11, and an unclear region like the above-described degradation region FR (refer to FIGS. 14 and 15) is not present. Hence, by mounting "the dome cover 11 (referring to FIG. 5) having the aspheric shape" on the camera unit 12 to perform imaging, image data that is excellent in sharpness with reduced image blurring can be acquired.

Figure 26:
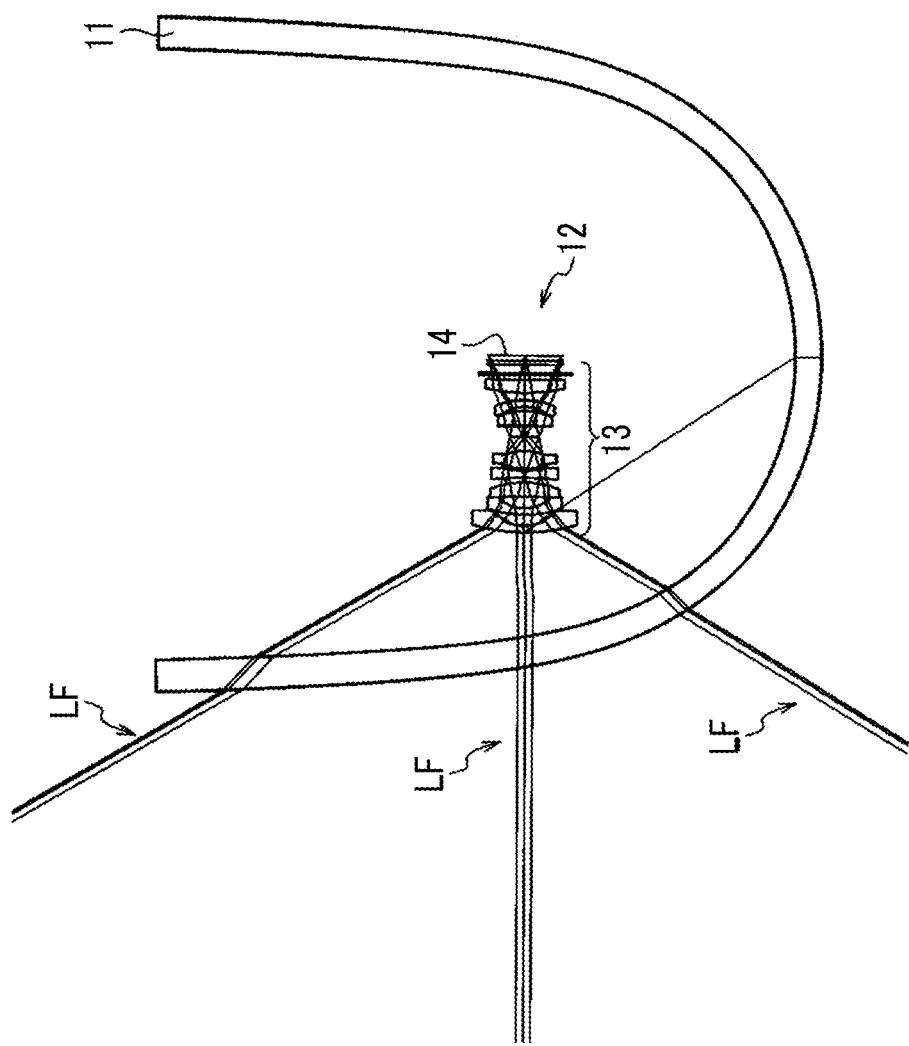
FIG. 26 illustrates an optical path diagram in a case where the dome cover illustrated in FIG. 20 is mounted on the camera unit, and an optical path diagram in a case where the tilt angle is 90 degree.

FIGS. 23 to 26 illustrate optical path diagrams in a case where the dome cover 11 illustrated in FIG. 20 is mounted on the camera unit 12, and illustrate optical path diagrams in a case where the tilt angles (refer to reference sign "θ" of FIG. 20) are 0 degree (refer to FIG. 23), 45 degrees (refer to FIG. 24), 70 degrees (refer to FIG. 25), and 90 degrees (refer to FIG. 26).

Next, a data processing system of the dome-type camera 10 on which the above-described "dome cover 11 having the aspheric shape" is mounted will be described.

Figure 27:
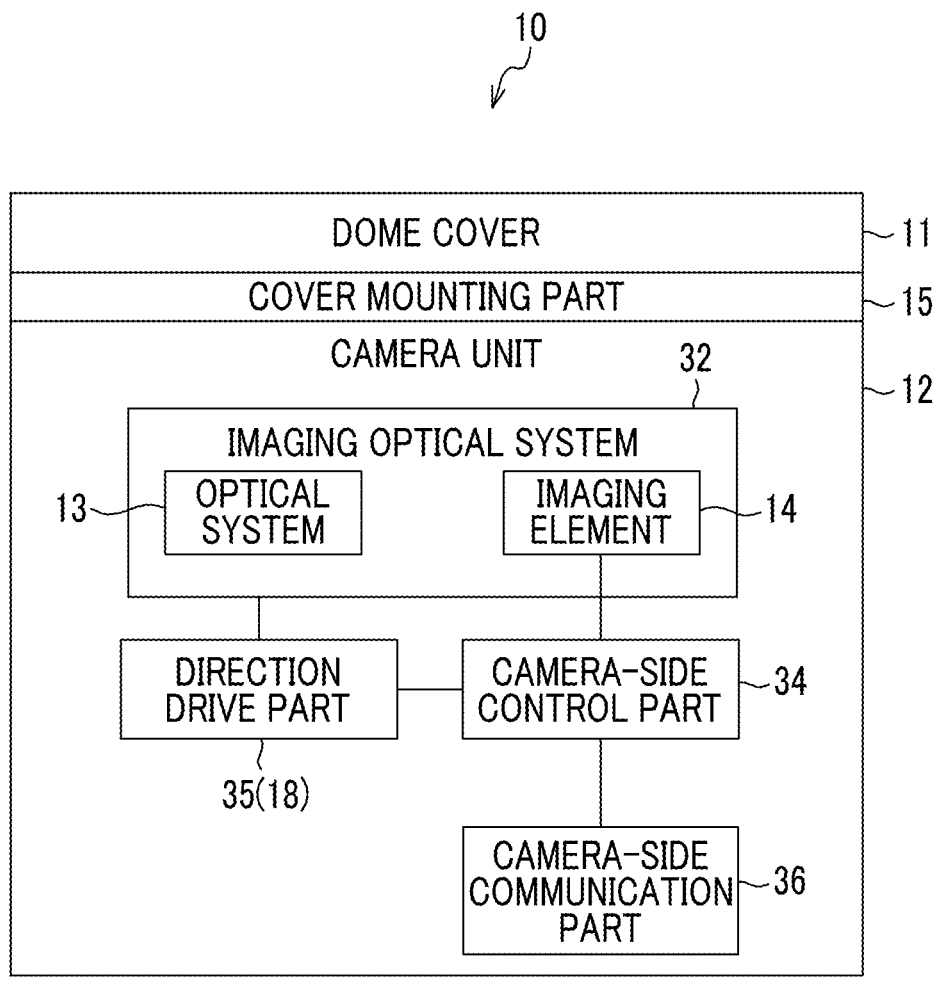
FIG. 27 is a block diagram illustrating a functional configuration example of the dome-type camera.

FIG. 27 is a block diagram illustrating a functional configuration example of the dome-type camera 10. In the dome-type camera 10 of the present example, the dome cover 11 is mounted on the camera unit 12 via the cover mounting part 15. The camera unit 12 has an imaging optical system 32 including the optical system 13 and the imaging element 14, a direction drive part 35, a camera-side control part 34, and a camera-side communication part 36. The direction drive part 35 includes the rotating section 18 (the panning part 18a and the tilting part 18b) illustrated in FIGS. 2 and 3, is controlled by the camera-side control part 34, and drives the imaging optical system 32 to change the optical axis direction (imaging direction) if necessary. The camera-side communication part 36 communicates with an external device under the control of the camera-side control part 34 to transmit and receive data.

The camera-side control part 34 controls the imaging element 14, the direction drive part 35, the camera-side communication part 36, and other functional parts that constitute the camera unit 12, and outputs image data from the imaging element 14, adjusts the imaging direction, or transmits and receives data, such as the image data, with respect to the external device. The camera-side control part 34 also performs various kinds of other processing, for example, performs various kinds of image processing and data writing, data reading, other calculation processing, and the like with respect to a memory (not illustrated).

Additionally, the camera-side control part 34 may determine whether or not the dome cover 11 to be actually mounted is compatible with the camera unit 12. In the above-described dome cover 11 of the aspheric shape, it is preferable to design and manufacture various kinds of properties, such as shape, size, and optical properties in accordance with the optical properties of the camera unit 12 (especially the optical system 13) of which the use is assumed in advance. In imaging using the dome cover 11 and camera unit 12 that are not compatible with each other, there is concern that the imaging performance of the camera unit 12 cannot be sufficiently exhibited. It is very difficult to determine compatibility with the camera unit 12 from the external appearance of the dome cover 11. For that reason, as will be described below, unsuitable combination of the dome cover 11 and the unsuitable camera unit 12 can be simply avoided by automatically determining the compatibility of combination of the dome cover 11 and the camera unit 12 to be actually mounted.

Figure 28:
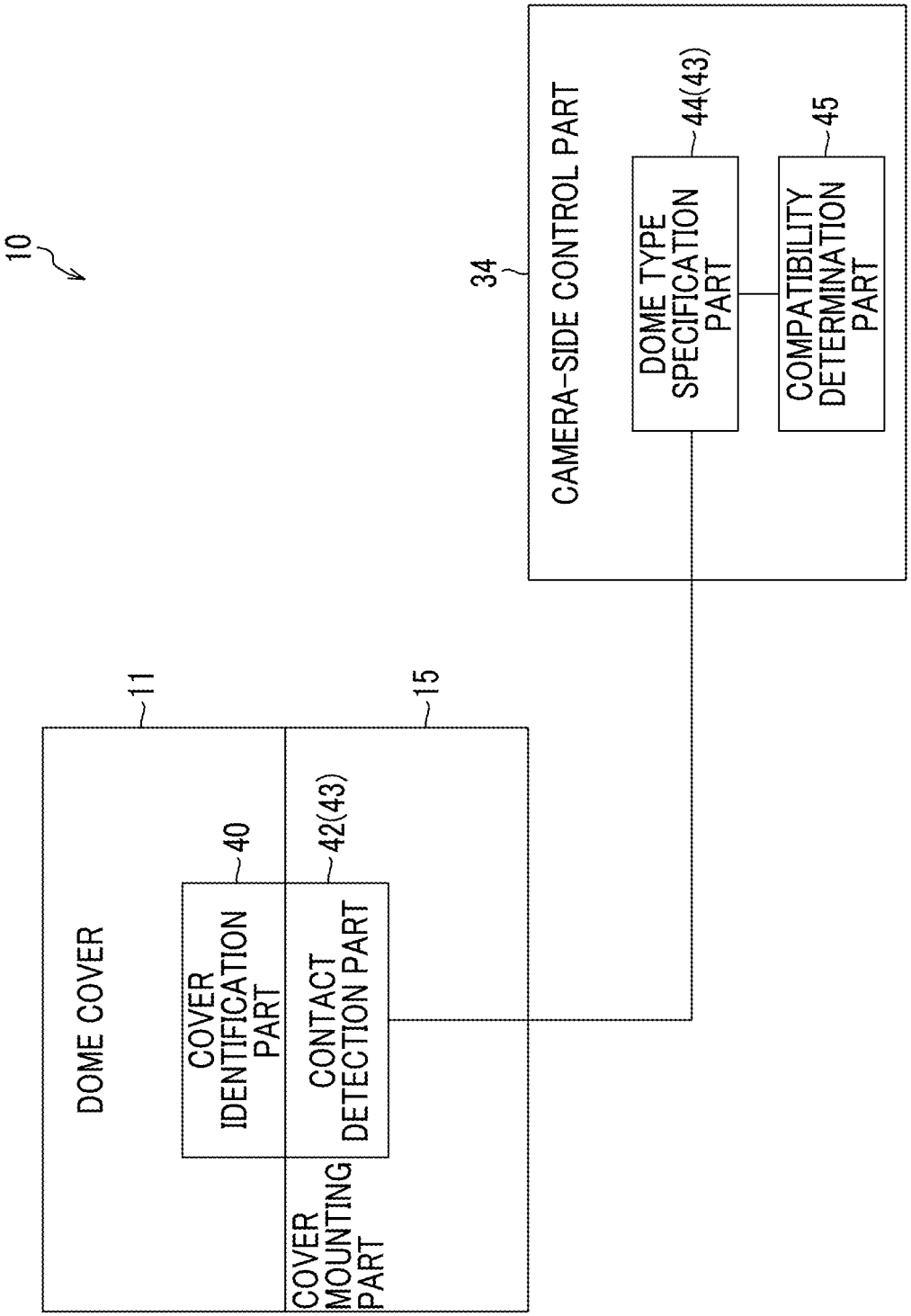
FIG. 28 is a block diagram illustrating a functional configuration example in which the compatibility between the dome cover and the camera unit is determined.

FIG. 28 is a block diagram illustrating a functional configuration example in which the compatibility between the dome cover 11 and the camera unit 12 is determined. In FIG. 28, a functional configuration of the dome cover 11, the cover mounting part 15, and the camera-side control part 34 regarding determination of the compatibility between the dome cover 11 and the camera unit 12 is mainly illustrated, and illustration of other functional configurations is omitted.

In the present example, the dome cover 11 is provided with a cover identification part 40, the cover mounting part 15 is provided with a contact detection part 42, and the camera-side control part 34 is provided with a dome type specification part 44 and a compatibility determination part 45.

The cover identification part 40 shows the type of the dome cover 11. Especially, the cover identification part 40 of the present example includes a unique shape portion according to the type of the dome cover 11. In the present example, if the dome cover 11 is mounted on the cover mounting part 15 (camera unit 12), the unique shape portion of the cover identification part 40 physically comes into contact with the contact detection part 42. The contact detection part 42 detects the presence/absence of the physical contact of the unique shape portion of the cover identification part 40. If a contact detection method using the contact detection part 42 is not particularly limited, for example, a mechanical switching method in which the unique shape portion of the cover identification part 40 depresses the contact detection part 42 if the dome cover 11 is mounted on the cover mounting part 15 (camera unit 12) is suitably used.

The dome type specification part 44 connected to the contact detection part 42 specifies the type of the dome cover 11 in accordance with a detection result of the contact detection part 42. In this way, a cover specification part 43 that specifies the type of the dome cover 11 on the basis of the cover identification part 40 has the contact detection part 42 and the dome type specification part 44 in the present example, and specifies the type of the dome cover 11 by detecting a unique shape of the cover identification part 40.

The compatibility determination part 45 is connected to the dome type specification part 44 (cover specification part 43), and determines the compatibility between the dome cover 11 and the camera unit 12 on the basis of the type of the dome cover 11 specified by the cover specification part 43 (the contact detection part 42 and the dome type specification part 44). The compatibility determination part 45 is capable of holding, for example a data table on "combination of the dome cover 11 and the camera unit 12" that are compatible with each other, in advance, and is capable of determining the compatibility between the dome cover 11 and the camera unit 12 that are mounted by referring to the data table. It is preferable that such a data table is updated if necessary by communication with the external device.

Figure 29:
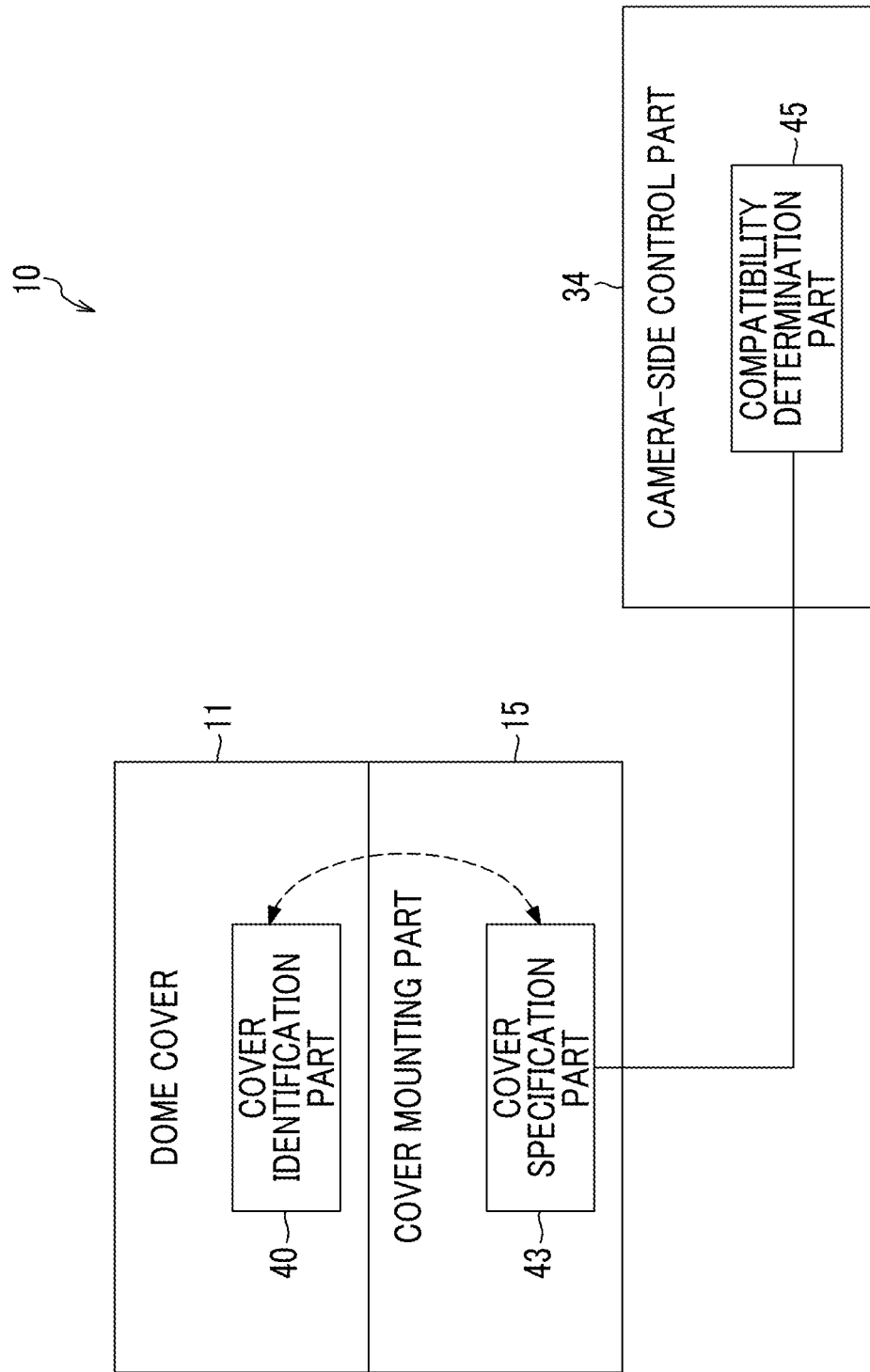
FIG. 29 is a block diagram illustrating another functional configuration example in which the compatibility between the dome cover and the camera unit is determined.

FIG. 29 is a block diagram illustrating another functional configuration example in which the compatibility between the dome cover 11 and the camera unit 12 is determined. In the present example, the dome cover 11 is provided with the cover identification part 40, the cover mounting part 15 is provided with the cover specification part 43, and the camera-side control part 34 is provided with the compatibility determination part 45.

Although the type of the dome cover 11 is specified in accordance with the physical contact of the cover identification part 40 in the above-described example illustrated in FIG. 28, the type of the dome cover 11 may be specified by reading "information on the type of the dome cover 11" recorded on the cover identification part 40 without being accompanied by the physical contact. That is, the cover identification part 40 records the information on the type of the dome cover 11 in a readable manner, and the cover specification part 43 is capable of specifying the type of the dome cover 11 by reading the information on the type of the dome cover 11 recorded on the cover identification part 40. Although a recording method in the cover identification part 40 and a reading method using the cover specification part 43 are not particularly limited, typically, electrical or optical recording method and reading method are available. For example, a radio frequency identifier (RFID) may be used, the cover identification part 40 may include a radio frequency (RF) tag on which the information on the type of the dome cover 11 is recorded in an electrically readable manner, and the cover specification part 43 may electrically read the information on the type of the dome cover 11, which is recorded on the RF tag. Additionally, the cover identification part 40 may a code part, such as bar codes or QR Codes (registered trademark), on which the information on the type of the dome cover 11 is recorded in optically readable manner, and the cover specification part 43 may optically read the information on the type of the dome cover 11 recorded on the code part.

In addition, in the example illustrated in FIG. 29, the cover mounting part 15 to which the dome cover 11 is directly attached is provided with the cover specification part 43. However, the installation location of the cover specification part 43 may not be particularly limited as long as "the information on the type of the dome cover 11" recorded on the cover identification part 40 can be read. For example, the camera-side control part 34 may be provided with the cover specification part 43.

Although a user is notified of "the determination result of the compatibility between the dome cover 11 and the camera unit 12" by the above-described compatibility determination part 45 (refer to FIGS. 28 and 29), a notification method is not particularly limited.

Figure 30:
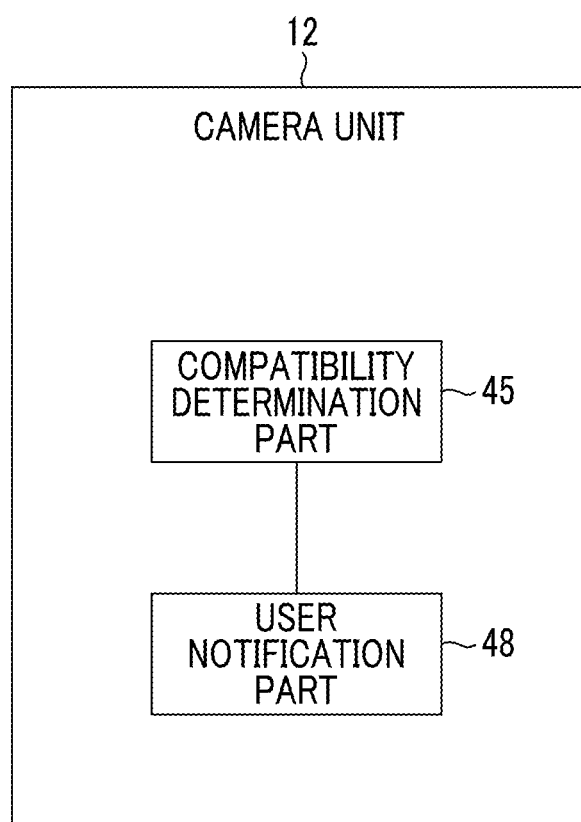
FIG. 30 is a block diagram illustrating a functional configuration example in which a user is notified of a determination result of the compatibility between the dome cover and a camera unit.

FIG. 30 is a block diagram illustrating a functional configuration example in which a user is notified of the determination result of the compatibility between the dome cover 11 and the camera unit 12. In FIG. 30, a functional configuration of the camera unit 12 regarding the notification of the determination result of the compatibility is mainly illustrated and the illustration of other functional configurations is omitted.

In the present example, the camera unit 12 is provided with the compatibility determination part 45 and a user notification part 48. The user notification part 48 is controlled by the compatibility determination part 45, and the compatibility determination part 45 notifies a user of the determination result of the compatibility between the dome cover 11 and the camera unit 12 via the user notification part 48. For example, in a case where a mounted dome cover 11 is not compatible with the camera unit 12, the compatibility determination part 45 can give a warning to a user via the user notification part 48.

Such a compatibility determination part 45 is capable of being realized by the camera-side control part 34 as described above (refer to FIGS. 28 and 29), and the user notification part 48 is capable of being realized by the light emitting part 17 (refer to FIG. 2). In a case where the light emitting part 17 constitutes the user notification part 48, a user may be notified of "the determination result of the compatibility between the dome cover 11 and the camera unit 12 by ON and OFF of the light emitting part 17 or combination of both ON and OFF. Additionally, in a case where the light emitting part 17 includes an indicator, such as a light emitting diode (LED), which is capable of changing light-emitting color, the notification may be performed by changing the light-emitting color of the light emitting part 17 in accordance with "the determination result of the compatibility between the dome cover 11 and the camera unit 12". The compatibility determination part 45, for example, may make the light emitting part 17 emit red light in a case where a mounted dome cover 11 is not compatible with the camera unit 12 or may make the light emitting part 17 emit green light in a case where a mounted dome cover 11 is compatible with the camera unit 12.

Additionally, in a case where the dome-type camera 10 is communicating with a terminal device directly operated by a user, a user may be notified of "the determination result of the compatibility between the dome cover 11 and the camera unit 12" via the terminal device.

Figure 31:
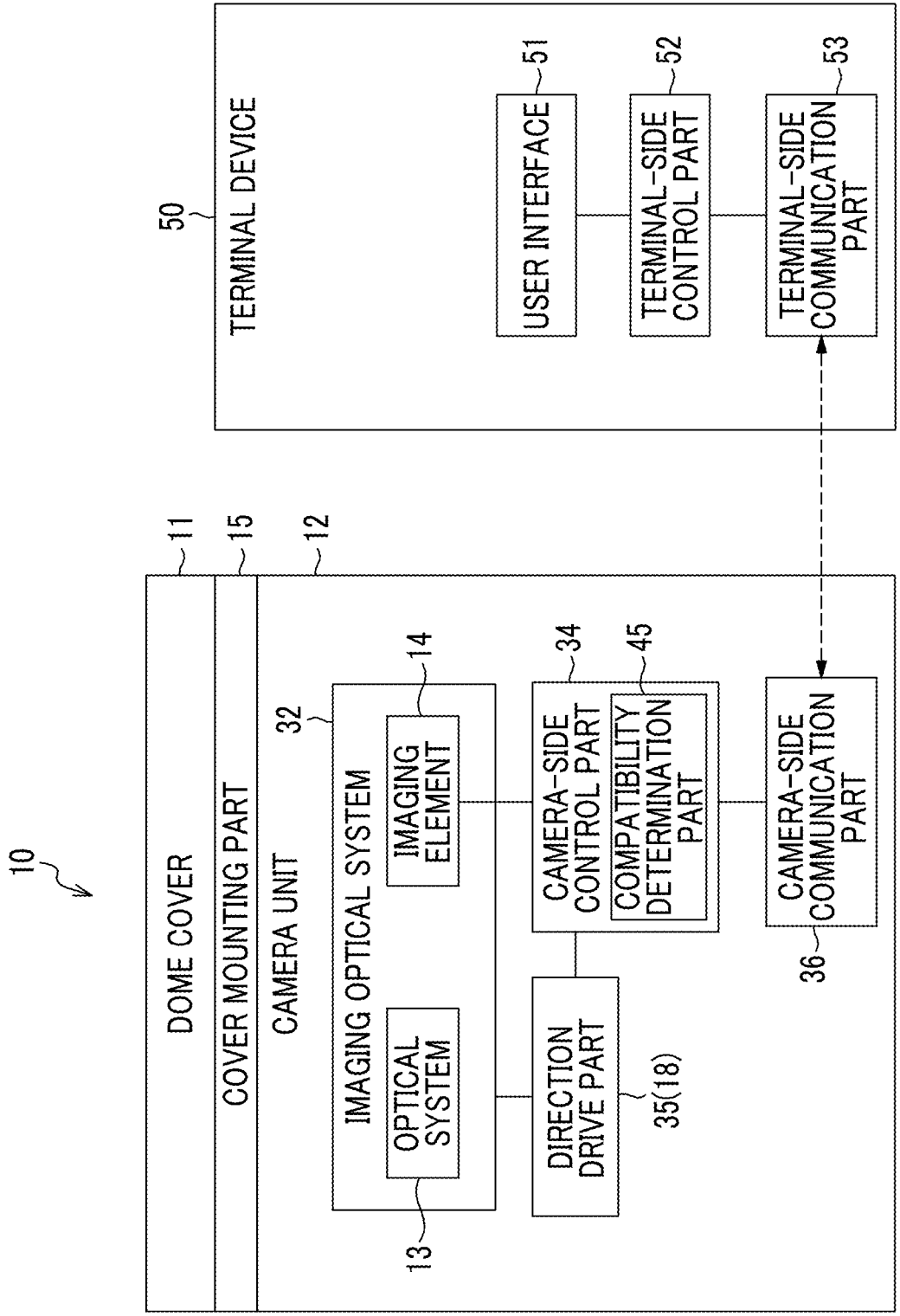
FIG. 31 is a block diagram illustrating another functional configuration in which the user is notified of the determination result of the compatibility between the dome cover and the camera unit.

FIG. 31 is a block diagram illustrating another functional configuration example that notifies a user of the determination result of the compatibility between the dome cover 11 and the camera unit 12. In FIG. 31, a functional configuration of the dome-type camera 10 and a terminal device 50 regarding the notification of the determination result of the compatibility is mainly illustrated and the illustration of other functional configurations is omitted.

The camera-side communication part 36 of the dome-type camera 10 of the present example is communicable with the terminal device 50 to be operated by a user. The terminal device 50 includes a terminal-side communication part 53 that communicates with the camera-side communication part 36, a terminal-side control part 52 connected to the terminal-side communication part 53, and a user interface 51 connected to the terminal-side control part 52.

The compatibility determination part 45 (camera-side control part 34) of the present example transmits the determination result of the compatibility between the dome cover 11 and the camera unit 12 to the terminal-side control part 52 via the camera-side communication part 36 and the terminal-side communication part 53. The terminal-side control part 52 notifies a user of the determination result of the compatibility between the dome cover 11 and the camera unit 12 via the user interface 51. In this way, in the present example, the user interface 51 has a function as the above-described user notification part (refer to reference sign "48" of FIG. 30), and the compatibility determination part 45 notifies a user of "the determination result of the compatibility between the dome cover 11 and the camera unit 12" through the user interface 51. In addition, the user interface 51 can notify a user of "the determination result of the compatibility between the dome cover 11 and the camera unit 12" by an arbitrary configuration (for example, a display, a loudspeaker, or the like).

Next, an example of the image processing according to the dome cover 11 will be described.

Generally, the properties of imaging light received by the imaging element 14 vary in accordance with the presence/absence of mounting of the dome cover 11. For that reason, in the image processing of the image data, there is a case where it is preferable to change the contents of processing in accordance with the presence/absence of mounting of the dome cover 11 during imaging. For example, if image correction processing (for example, point image restoration processing, color shading correction processing, mixed color correction processing, and the like) constructed on the assumption that the dome cover 11 is mounted is applied to the image data acquired by imaging without the mounting of the dome cover 11, erroneous correction may occur. For that reason, with respect to the image data acquired by imaging without mounting the dome cover 11, it is desirable to turn off such image correction processing so as not to perform the image correction processing or to make correction intensity lower than that in a case where the image correction processing is applied to "the image data acquired by imaging with the dome cover 11 is mounted".

For that reason, it is preferable to detect the presence/absence of mounting of the dome cover 11 and change image processing conditions in accordance with a detection result.

Figure 32:
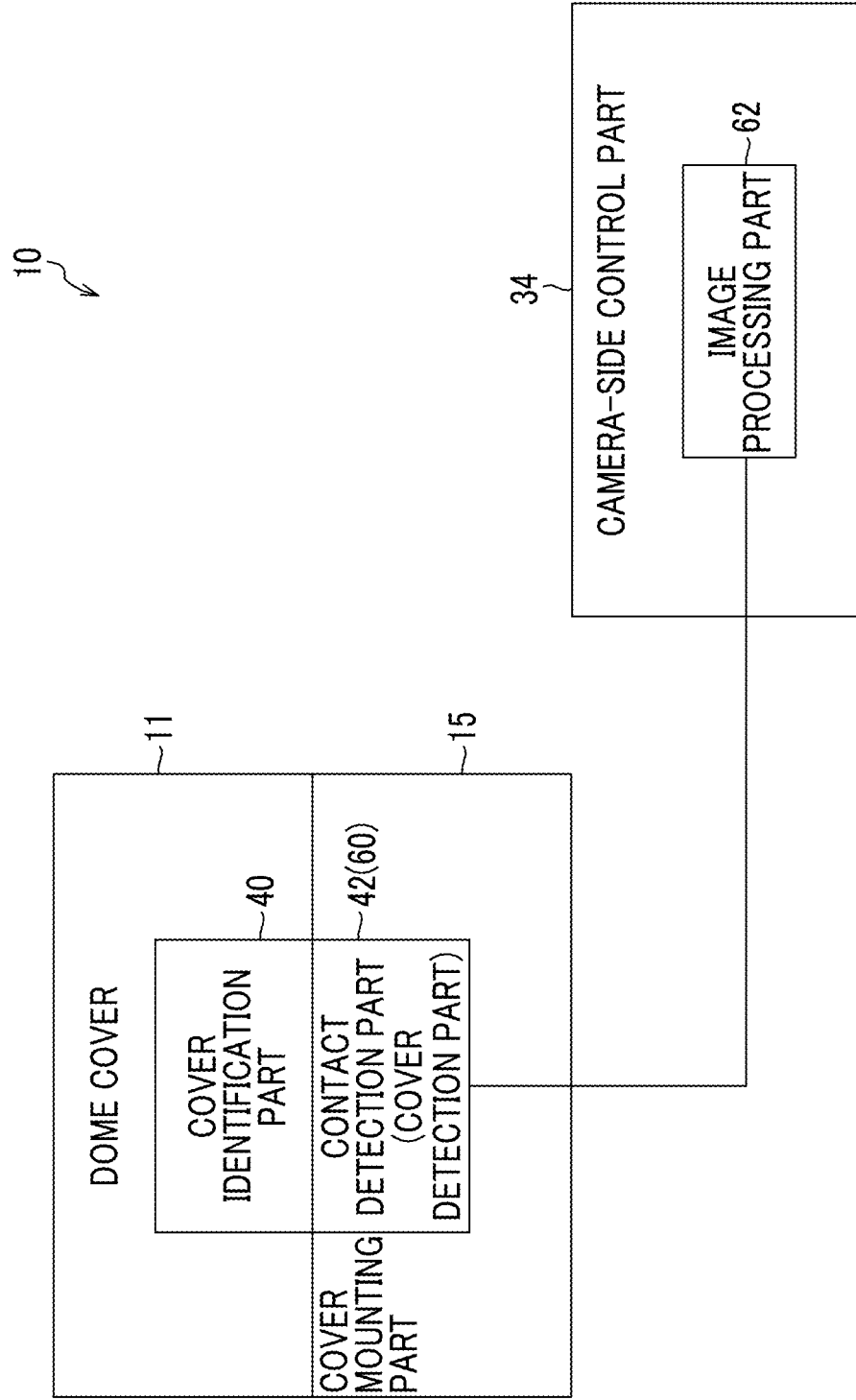
FIG. 32 is a block diagram illustrating a functional configuration example in which adjustment of image processing is performed in accordance with the presence/absence of mounting of the dome cover.

FIG. 32 is a block diagram illustrating a functional configuration example in which adjustment of the image processing is performed in accordance with the presence/absence of mounting of the dome cover 11. In FIG. 32, a functional configuration of the dome cover 11, the cover mounting part 15, and the camera-side control part 34 regarding the adjustment of the image processing is illustrated, and the illustration of other functional configurations is omitted.

In the present example, the dome cover 11 is provided with the cover identification part 40, the cover mounting part 15 is provided with the contact detection part 42 that acts as a cover detection part 60, and the camera-side control part 34 is provided with an image processing part 62.

Also in the dome-type camera 10 of the present example, similar to the above-described cover identification part 40 illustrated in FIG. 28, the unique shape portion of the cover identification part 40 physically comes into contact with the contact detection part 42 if the dome cover 11 is mounted on the cover mounting part 15 (camera unit 12). The contact detection part 42 (cover detection part 60) detects whether or not the dome cover 11 is mounted on the camera unit 12 (cover mounting part 15) in accordance with the presence/absence of contact of the cover identification part 40.

Although the image processing part 62 performs the image processing on the image data output from the imaging element 14, the image processing part 62 of the present example adjusts the image processing of the image data in accordance with the detection result of the contact detection part 42 (cover detection part 60). The image processing performed by the image processing part 62 is not particularly limited, and one kind of or a plurality of kinds of image processing, such as point image restoration processing, color shading correction processing, and mixed color correction processing, can be performed. In a case where it is determined from the detection result of the contact detection part 42 (cover detection part 60) that the dome cover 11 is mounted on the cover mounting part 15 (camera unit 12), the image processing part 62 may make the degree of the image processing lower than that in a case where it is determined that the dome cover 11 is mounted on the cover mounting part 15 (camera unit 12) or may not perform the image processing.

Figure 33:
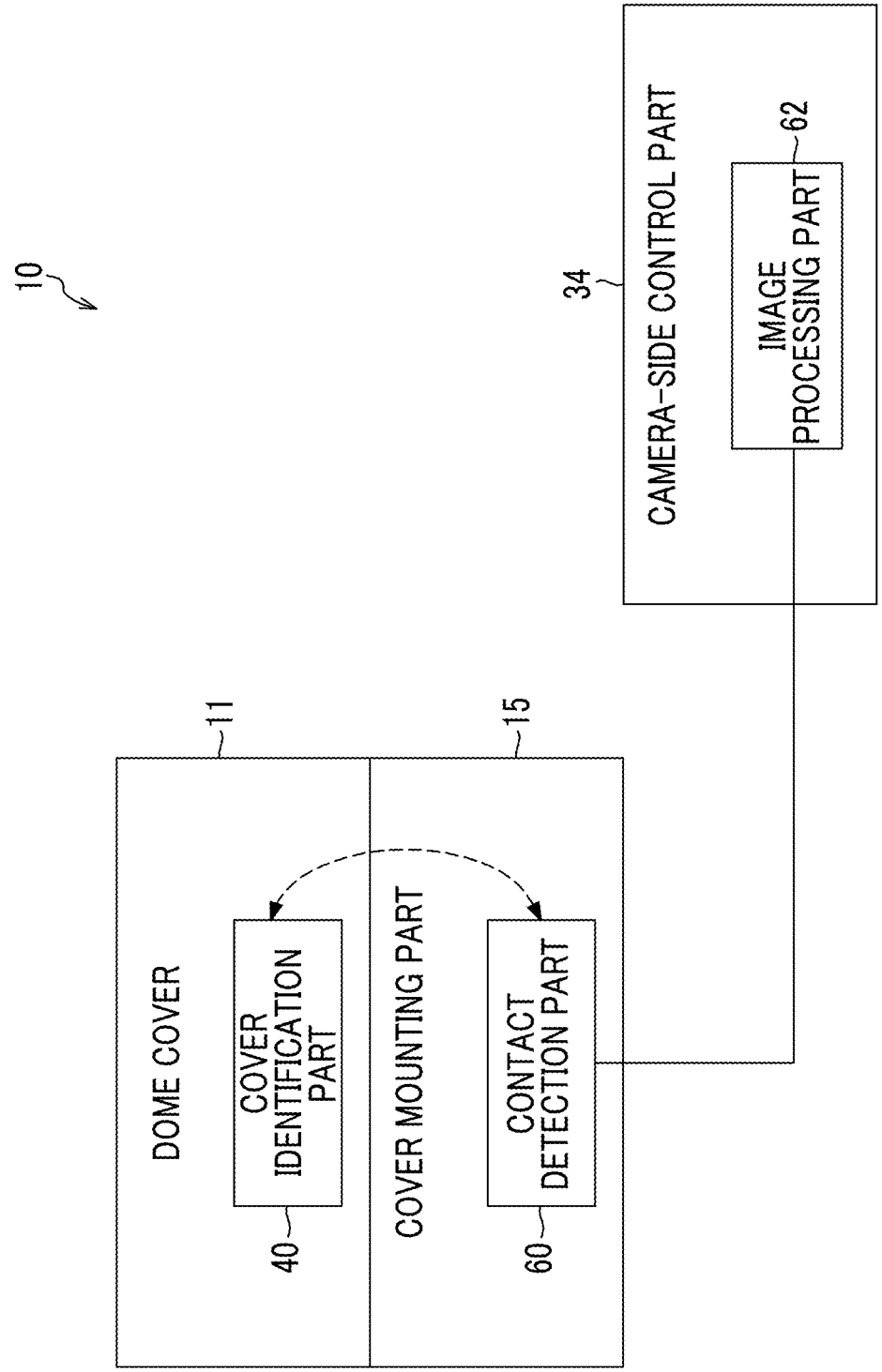
FIG. 33 is a block diagram illustrating another functional configuration example in which the adjustment of the image processing is performed in accordance with the presence/absence of the mounting of the dome cover.

FIG. 33 is a block diagram illustrating another functional configuration example in which the adjustment of the image processing is performed in accordance with the presence/absence of mounting of the dome cover 11. In FIG. 33, a functional configuration of the dome cover 11, the cover mounting part 15, and the camera-side control part 34 regarding the adjustment of the image processing is illustrated, and the illustration of other functional configurations is omitted.

In the present example, the dome cover 11 is provided with the cover identification part 40, the cover mounting part 15 is provided with the cover detection part 60, and the camera-side control part 34 is provided with the image processing part 62.

Although the presence/absence of mounting of the dome cover 11 is detected in accordance with the physical contact of the cover identification part 40 in the above-described example illustrated in FIG. 32, the presence/absence of mounting of the dome cover 11 may be detected by reading "information on the dome cover 11" recorded on the cover identification part 40 without being accompanied by the physical contact. The cover identification part 40 illustrated in FIG. 33 records the information on the dome cover 11 in an electrically or optically readable manner, and the cover detection part 60 is capable of detecting the presence/absence of mounting of the dome cover 11 by electrically or optically reading the information on the dome cover 11 recorded on the cover identification part 40.

Similarly to the example illustrated in FIG. 32, the image processing part 62 adjusts the image processing of the image data in accordance with a detection result of the cover detection part 60.

In addition, in the example illustrated in FIG. 33, the cover mounting part 15 to which the dome cover 11 is directly attached is provided with the cover detection part 60. However, the installation location of the cover detection part 60 may not be particularly limited as long as "the information on the dome cover 11" recorded on the cover identification part 40 can be read. For example, the camera-side control part 34 may be provided with the cover detection part 60. However, it is preferable that an arrangement relationship between the cover identification part 40 and the cover detection part 60 satisfies "conditions that the cover detection part 60 can read the information on the dome cover 11 recorded on the cover identification part 40 in a case where the dome cover 11 is mounted on the cover mounting part 15 (the camera unit 12)" and/or "conditions that the cover detection part 60 cannot read the information on the dome cover 11 recorded on the cover identification part 40 in a case where the dome cover 11 is not mounted on the cover mounting part 15 (camera unit 12)".

Other Modification Examples

Application of the invention is not limited to the above-described embodiment, and various kinds of modification may be added to the above-described embodiment, and the above-described embodiment may be appropriately combined. For example, the above-described "functional configuration (for example, refer to FIGS. 28 to 31) in which the compatibility between the dome cover 11 and the camera unit 12" is determined and "functional configuration (for example, refer to FIGS. 32 to 33) in which the image processing is adjusted in accordance with the presence/absence of mounting of the dome cover 11" can be realized by the same dome-type camera 10.

Additionally, in the above-described embodiment, "the dome cover 11 of which the front surface 21 and the back surface 22 have the aspheric shape" has been described. However, the above-described embodiment is effective also for "the dome cover 11 in which only the back surface 22 out of the front surface 21 and the back surface 22 has the aspheric shape having no discontinuous section at least at a location other than the top". Such "a dome cover 11 in which only the back surface 22 has then aspheric shape" can be used for, for example, in underwater imaging or the like.

Additionally, shape measurement of the dome cover 11 as to whether or not the discontinuous section is present or and where the aspheric shape is present can be performed by arbitrary methods. For example, the shape of the dome cover 11 may be indirectly measured by analyzing the image quality (for example, image blurring or the like) of the image data acquired by imaging using the dome cover 11, or the shape of the dome cover 11 may be directly measured with arbitrary measuring devices.

Additionally, the above-described respective functional configurations can be realized by arbitrary hardware, arbitrary software, or the combination of both, for example, can be realized by appropriately combining a central processing unit (CPU), volatile random access memory (RAM), and nonvolatile memories, such as an electrically erasable programmable read-only memory (EEPROM), and/or various kinds of operating programs, such as an operating system (OS) and an application program. Additionally, the invention can also be applied to programs that make a computer execute procedures for various kinds of processing regarding an imaging method, a control processing method, an image processing method, and the like in the respective parts of the above-described dome-type camera 10 (camera-side control part 34 and the like), a computer-readable recording medium (non-transitory tangible medium) on which the programs are recorded, or a computer capable of installing the programs.

Additionally, the aspects to which the invention can be applied are not limited to the dome cover 11 and the dome-type camera 10 that are illustrated in FIGS. 1 to 3. For example, it is also possible to appropriately apply the above-described various aspects to the dome-type camera 10 and the dome cover 11 in which the dome cover 11 and the camera unit 12 are integrally provided and thus both cannot be basically separated from each other.

Additionally, the above-described terminal device 50 (refer to FIG. 31) may have functions other than the user notification part that notifies a user of the determination result of the compatibility between the dome cover 11 and the camera unit 12, or a user may use the terminal device 50 as a terminal that instructs the user on imaging using the dome-type camera 10. That is, the terminal-side control part 52 may transmit "various control signals for controlling the dome-type camera 10" to the camera-side control part 34 via the terminal-side communication part 53 and the camera-side communication part 36 in accordance with an instruction signal input by a user via the user interface 51.

Additionally, the form of the terminal device 50 is not particularly limited. For example, the terminal device 50 can be realized by exclusive workstations or exclusive mobile devices (for example, portable telephones, smartphones, personal digital assistants (PDAs)), portable game machines, and the like. Hereinafter, an example of a smartphone available as the terminal device 50 will be described.

Configuration of Smartphone

Figure 34:
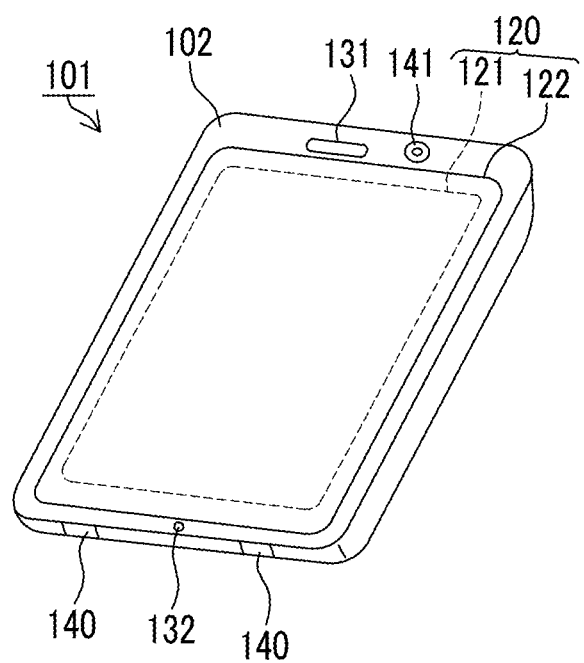
FIG. 34 is a view illustrating an external appearance of a smartphone that is one embodiment of an imaging device of the invention.

FIG. 34 is a view illustrating an external appearance of a smartphone 101 that is one embodiment of the imaging device of the invention. A smartphone 101 illustrated in FIG. 34 has a flat plate-shaped housing 102, and a display input part 120 in which a display panel 121 serving as a display part and a control panel 122 serving as an input part are integrated and formed on one surface of the housing 102. Additionally, the housing 102 includes a loudspeaker 131, a microphone 132, an operating part 140, and a camera part 141. In addition, the configuration of the housing 102 is not limited to this. For example, a configuration in which the display part and the input part are independently provided can be adopted or a configuration having a folded structure and a sliding mechanism can also be adopted.

Figure 35:
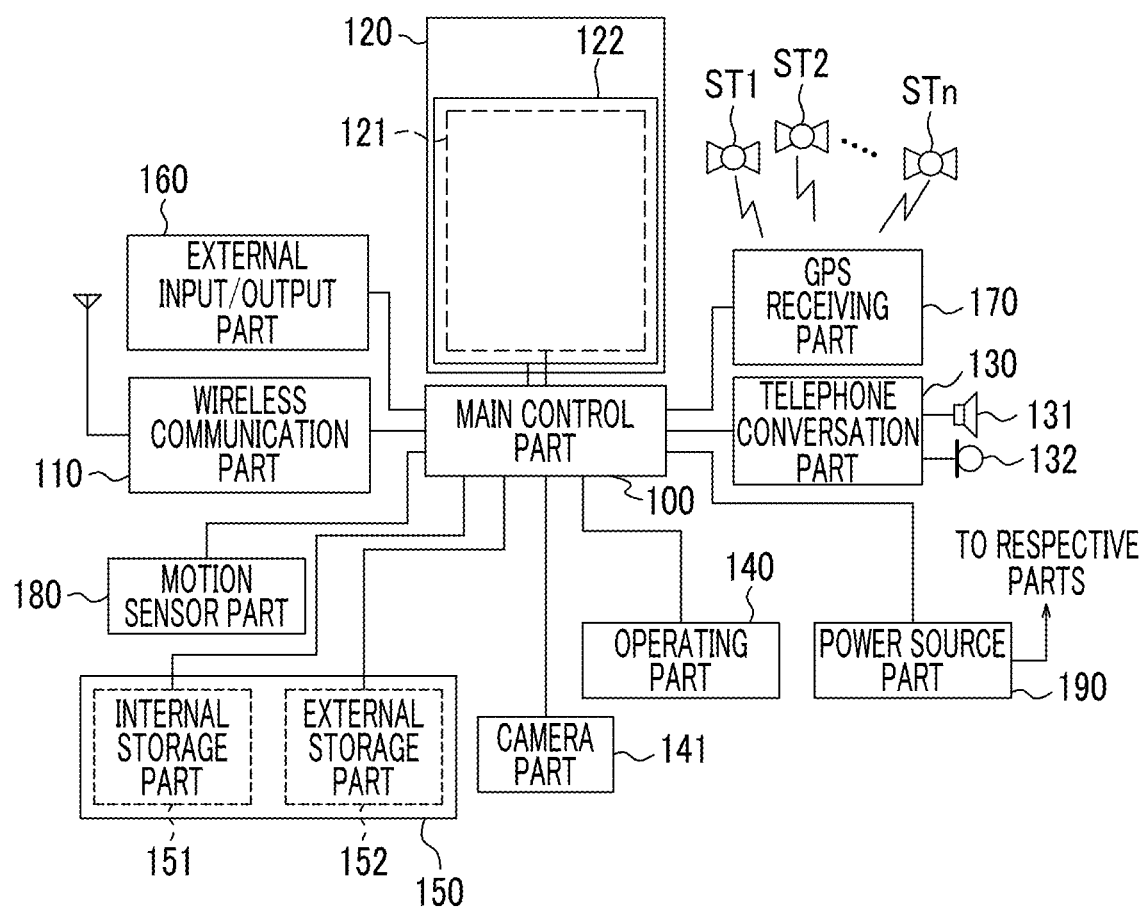
FIG. 35 is a block diagram illustrating the configuration of the smartphone illustrated in FIG. 34.

FIG. 35 is a block diagram illustrating the configuration of the smartphone 101 illustrated in FIG. 34. As illustrated in FIG. 35, main constituent elements of the smartphone 101 include a radio communications part 110, the display input part 120, a telephone conversation part 130, the operating part 140, the camera part 141, a storage part 150, an external input/output part 160, a global positioning system (GPS) receiving part 170, a motion sensor part 180, a power source part 190, and a main control part 100. Additionally, a main function of a smartphone 101 has a wireless communication function of performing mobile radio communication via a base station device and a mobile radio communication network.

The radio communications part 110 performs wireless communication with the base station device connected to the mobile radio communication network in accordance with the instruction of the main control part 100. The wireless communication is used to perform transmission and reception of various file data, such as voice data and image data, E-mail data, or the like, and reception of Web data, streaming data, or the like.

The display input part 120 is a so-called touch panel including the display panel 121 and the control panel 122, and displays images (still images and dynamic images), text information, or the like to visually transmit the information to a user, and detects a user operation for the displayed information, through the control of the main control part 100.

As for the display panel 121, a liquid crystal display (LCD) or an organic electro-luminescence display (OELD) is used as a display device. The control panel 122 is a device that is provided in a state where an image displayed on a display surface of the display panel 121 is visually recognizable, and detects one or a plurality of coordinates that are operated by a user's finger or a stylus. If the device is operated by the user's finger or the stylus, the control panel 122 outputs a detection signal generated due to the operation to the main control part 100. Next, the main control part 100 detects an operation position (coordinates) on the display panel 121 on the basis of the received detection signal.

One embodiment of the imaging device of the invention has an arrangement such that the display panel 121 and the control panel 122 of the smartphone 101 that are exemplified in FIG. 34 are integrated together to constitute the display input part 120 and the control panel 122 completely covers the display panel 121. In a case where the arrangement is adopted, the control panel 122 may include a function of detecting a user operation even in a region outside the display panel 121. In other words, the control panel 122 may include a detection region (hereinafter referred to as a "display region") for an overlapping portion that overlaps the display panel 121, and a detection region (hereinafter referred to as "a non-display region") for an outer edge portion that does not overlap the display panel 121 other than the detection region.

In addition, although the size of the display region and the size of the display panel 121 may be made to completely coincide with each other, it is not necessary to make both coincide with each other. Additionally, the control panel 122 may include two sensitive regions including the outer edge portion and an inside portion other than the outer edge portion. Moreover, the width of the outer edge portion is appropriately designed in accordance with the size or the like of the housing 102. Furthermore, the position detection method adopted in the control panel 122 may include a matrix switch method, a resistance film method, a surface acoustic wave method, an infrared method, an electromagnetic induction method, a capacitive sensing method, and the like, and any method of these methods may be adopted.

The telephone conversation part 130 includes the loudspeaker 131 and the microphone 132, and converts a user's voice input through the microphone 132 into voice data capable of being processed by the main control part 100 to output the voice data to the main control part 100 or decodes voice data received by the radio communications part 110 or the external input/output part 160 to output the decoded voice data from the loudspeaker 131. Additionally, as illustrated in FIG. 34, for example, the loudspeaker 131 can be mounted on the same surface as a surface provided with the display input part 120, and the microphone 132 can be mounted on a side surface of the housing 102.

The operating part 140 receives an instruction from a user, which is a hardware key using a key switch or the like. For example, as illustrated in FIG. 34, the operating part 140 is a push button-type switch that is mounted on a side surface of the housing 102 of the smartphone 101, is switched on if pushed with a finger or the like, and is switched off due to a restoring force of a spring or the like if the finger is lifted.

The storage part 150 stores control programs and control data of the main control part 100, application software, address data in which names, telephone numbers, and the like of communication partners are associated with each other, transmitted and received E-mail data, Web data downloaded by Web browsing, downloaded content data, and the like, and temporarily stores streaming data and the like. Additionally, the storage part 150 is constituted by an internal storage part 151 that is built in the smartphone, and an external storage part 152 that has a slot for a detachable external memory. In addition, each of the internal storage part 151 and the external storage part 152 that constitute the storage part 150 is realized by using a storage medium, such as a memory (for example, MicroSD (registered trademark) memory or the like) of a flash memory type, a hard disk type, a multimedia card micro type, or a card type, a random access memory (RAM), a read only memory (ROM), or the like.

The external input/output part 160 serves as an interface with all external devices coupled to the smartphone 101, and is directly or indirectly connected to other external devices by communication or the like (for example, a universal serial bus ((USB), IEEE1394 determined by The Institute of Electrical and Electronics Engineers (IEEE), Inc.), network (for example, an Internet, a wireless LAN, Bluetooth (registered trademark), RFID, infrared data association (IrDA) (registered trademark), Ultra Wideband (UWB) (registered trademark), ZigBee (registered trademark), or the like.

As the external devices coupled to the smartphone 101, for example, there are a wired/wireless head set, a wired/wireless external charger, a wired/wireless data port, a memory card, a subscriber identity module card (SIM)/user identity module card (VIM) that is connected via a card socket, an external audio video device connected via an audio video I/O (Input/Output) terminal, a wirelessly connected external audio video device, a wiredly/wirelessly connected smartphone, a wiredly/wirelessly connected personal computer, a wiredly/wireless connected PDA, a wiredly/wirelessly connected earphone, and the like. The external input/output part 160 may be configured so as to transmit the data transmitted from such external devices to respective constituent elements inside the smartphone 101 or transmit the data inside the smartphone 101 to the external devices.

The GPS receiving part 170 receives GPS signals transmitted from GPS satellites ST1 and ST2 to STn in accordance with the instruction of the main control part 100, executes positioning calculation processing based on the plurality of received GPS signals, and detects a position specified by the latitude, longitude, and altitude of the smartphone 101. The GPS receiving part 170 is also capable of detecting the position using positional information in a case where the positional information can be acquired from the radio communications part 110 and/or the external input/output part 160 (for example, a wireless local area network (LAN)).

The motion sensor part 180 includes, for example, a 3-axis acceleration sensor and the like, and detects a physical motion of the smartphone 101 in accordance with the instruction of the main control part 100. By detecting the physical motion of the smartphone 101, a direction or acceleration in or at which the smartphone 101 moves is detected. The detection result is output to the main control part 100.

The power source part 190 supplies electrical power stored in a battery (not illustrated) to the respective parts of the smartphone 101 in accordance with the instruction of the main control part 100.

The main control part 100 includes a microprocessor, operates in accordance with the control programs and the control data stored in the storage part 150, and generally controls the respective parts of the smartphone 101. Additionally, the main control part 100 includes a mobile communication control function and an application processing function of controlling respective parts of a communication system in order to perform voice communication and data communication through the radio communications part 110.

The application processing function is realized as the main control part 100 operates in accordance with application software stored in the storage part 150. As the application processing function, for example, there is an infrared-ray communication function of performing data communication with a counterpart device by controlling the external input/output part 160, an E-mail function of performing transmission and reception of E-mails, a Web browsing function of browsing Web pages, and the like.

Additionally, the main control part 100 includes an image processing function of displaying an image on the display input part 120 on the basis of image data (data of still images or dynamic images), such as received data or downloaded streaming data. The image processing function means a function in which the main control part 100 decodes the above image data, performs image processing on results of the decoding, and displays an image obtained through the image processing on the display input part 120.

Moreover, the main control part 100 executes the display control for the display panel 121 and the operation detection control of detecting a user operation through the operating part 140 or the control panel 122.

By means of the execution of the display control, the main control part 100 display a software key, such as an icon for starting application software or a scroll bar, or displays a window for creating an E-mail. In addition, the scroll bar means a software key for receiving an instruction for moving a display portion of an image regarding a large image or the like that cannot be fit in the display region of the display panel 121.

Additionally, by means of the execution of the operation detection control, the main control part 100 detects a user operation through the operating part 140, receives an operation for the above icon or and the input of a character string to an input column of the above window through the control panel 122, or receives a scroll request of a display image through the scroll bar.

Moreover, by means of the execution of the operation detection control, the main control part 100 has a touch panel control function in which the main control part determines whether or not the operation position for the control panel 122 corresponds to the overlapping portion (display region) that overlaps the display panel 121 or determines whether or not the operation position corresponds to the outer edge portion that does not overlap the display panel 121 (non-display region) other than the operation position and controls the sensitive region of the control panel 122, or the display position of the software key.

Additionally, the main control part 100 is also capable of detecting a gesture operation for the control panel 122 and executing a preset function in accordance with the detected gesture operation. The gesture operation means not a related-art simple touch operation but the operation of drawing a track with a finger or the like, simultaneously specifying a plurality of positions, or combining these to draw a track for at least one from a plurality of positions.

The camera part 141 is a digital camera that performs electronic imaging using imaging elements, such as a complementary metal oxide semiconductor (CMOS). Additionally, the camera part 141 is capable of converting the image data obtained by the imaging into, for example, compressed image data, such as Joint Photographic Experts Group (JPEG), by the control of the main control part 100, recording the image data on the storage part 150, or outputting the recorded image data through the external input/output part 160 or the radio communications part 110. As illustrated in FIG. 34, in the smartphone 101, the camera part 141 is mounted on the same surface as the display input part 120. However, the mounting position of the camera part 141 is not limited to this. The camera part 141 may be mounted on the back surface of the housing 102 instead of the front surface of the housing 102 on which the display input part 120 is provided, or a plurality of the camera parts 141 may be mounted on the housing 102. In addition, in a case where the plurality of camera parts 141 are mounted, imaging may be performed by a single camera part 141 by switching the camera part 141 used for imaging, or imaging may be performed by simultaneously using the plurality of camera parts 141.

Additionally, the camera part 141 can be applied to various functions of the smartphone 101. For example, an image acquired by the camera part 141 may be displayed on the display panel 121, or an image acquired by imaging using the camera part 141 may be used as one of operation input techniques of the control panel 122. Additionally, when the GPS receiving part 170 detects a position, the position may be detected by referring to an image from the camera part 141. Moreover, since the image from the camera part 141 is referred to, it is possible to determine the optical axis direction of the camera part 141 of the smartphone 101 or it is also possible to determine the current usage environment without using the 3-axis acceleration sensor or using the 3-axis acceleration sensor together. It is natural that the angle of view from the camera part 141 can also be used within application software.

In addition, the data obtained by adding positional information acquired by the GPS receiving part 170, voice information acquired by the microphone 132 (may be text information obtained by perform voice text conversion using the main control part or the like), posture information or the like acquired by the motion sensor part 180, or the like to data of still images or dynamic images can be recorded on the storage part 150, or can also be output through the external input/output part 160 or the radio communications part 110.

EXPLANATION OF REFERENCES

10: dome-type camera
11a: cover opening
11: dome cover
12: camera unit
13: optical system
14: imaging element
15: cover mounting part
16: control panel
17: light emitting part 18a: panning part
18b: tilting part
18: rotating section
19: supporting section
21: front surface
22: back surface
23: spherical section
24: skirt section
25: discontinuous section
30: image data
32: imaging optical system
34: camera-side control part
35: direction drive part
36: camera-side communication part
40: cover identification part
42: contact detection part
43: cover specification part
44: dome type specification part
45: compatibility determination part
48: user notification part
50: terminal device
51: user interface
52: terminal-side control part
53: terminal-side communication part
60: cover detection part
62: image processing part
100: main control part
101: smartphone
102: housing
110: radio communications part
120: display input part
121: display panel
122: control panel
130: telephone conversation part
131: loudspeaker
132: microphone
140: operating part
141: camera part
150: storage part
151: internal storage part
152: external storage part
160: external input/output part
170: GPS receiving part
180: motion sensor part
190: power source part

What is claimed is:

1. A dome-type camera comprising:
a dome cover having a front surface and a back surface; and
a camera unit including
an optical system disposed on the back surface side of the dome cover, and an imaging element that outputs image data on the basis of imaging light received via the optical system,
wherein at least the back surface out of the front surface and the back surface of the dome cover has an aspheric shape in which optical properties are continuously changed at least at a location other than a top of the dome cover,
wherein at least the back surface out of the front surface and the back surface of the dome cover has a hyper-elliptical shape in a longitudinal section of the dome cover.

2. The dome-type camera according to claim 1,
wherein the dome cover is detachably mounted on the camera unit.

3. The dome-type camera according to claim 2, further comprising:
a cover identification part that is provided in the dome cover and shows the type of the dome cover; and
a cover specification part that specifies the type of the dome cover on the basis of the cover identification part.

4. The dome-type camera according to claim 3,
wherein the cover identification part includes a unique shape portion according to the type of the dome cover, and
wherein the cover specification part specifies the type of the dome cover by detecting the unique shape portion of the cover identification part.

5. The dome-type camera according to claim 4,
wherein the cover specification part includes
a contact detection part that detects physical contact of the unique shape portion of the cover identification part, and
a dome type specification part that specifies the type of the dome cover in accordance with a detection result of the contact detection part,
wherein, if the dome cover is mounted on the camera unit, the unique shape portion of the cover identification part physically comes into contact with the contact detection part.

6. The dome-type camera according to claim 3,
wherein the cover identification part records information on the type of the dome cover in an electrically readable manner, and
wherein the cover specification part specifies the type of the dome cover by electrically reading the information on the type of the dome cover recorded on the cover identification part.

7. The dome-type camera according to claim 3,
wherein the cover identification part records information on the type of the dome cover in an optically readable manner, and
wherein the cover specification part specifies the type of the dome cover by optically reading the information on the type of the dome cover recorded on the cover identification part.

8. The dome-type camera according to claim 3, further comprising:
a compatibility determination part that determines compatibility between the dome cover and the camera unit on the basis of the type of the dome cover specified by the cover specification part.

9. The dome-type camera according to claim 8, further comprising:
a user notification part controlled by the compatibility determination part,
wherein the compatibility determination part notifies a user of a determination result of the compatibility between the dome cover and the camera unit via the user notification part.

10. The dome-type camera according to claim 8, further comprising:
a camera-side communication part that is communicable with a terminal device,
wherein the terminal device includes
a terminal-side communication part that communicates with the camera-side communication part,
a terminal-side control part connected to the terminal-side communication part, and
a user interface connected to the terminal-side control part, wherein the compatibility determination part transmits a determination result of the compatibility between the dome cover and the camera unit to the terminal-side control part via the camera-side communication part and the terminal-side communication part, and wherein the terminal-side control part notifies a user of the determination result of the compatibility between the dome cover and the camera unit via the user interface.

11. The dome-type camera according to claim 1, further comprising:

an image processing part that performs image processing of the image data, and a cover detection part that detects whether or not the dome cover is mounted on the camera unit, wherein the image processing part adjusts the image processing of the image data in accordance with a detection result of the cover detection part.

12. The dome-type camera according to claim 1, further comprising:

a direction drive part capable of driving the optical system to change an optical axis direction.

13. The dome-type camera according to claim 1, wherein a focal length of the optical system is variable.

14. The dome-type camera according to claim 1, wherein the optical system has an angle of view of 90 degrees or more.

* * * * *